(12) United States Patent
Rainey et al.

(10) Patent No.: US 11,347,819 B2
(45) Date of Patent: May 31, 2022

(54) CUSTOMIZABLE WEATHER ANALYSIS SYSTEM FOR OUTPUTTING USER-SPECIFIED PROCEDURES IN RESPONSE TO WEATHER-RELATED WARNINGS

(71) Applicant: AccuWeather, Inc., State College, PA (US)

(72) Inventors: R. Lee Rainey, State College, PA (US); Bill Vincent, Wichita, KS (US); Casey Mcgeever, State College, PA (US); Michelle L. Massung, Philipsburg, PA (US); Gregg Pavlik, State College, PA (US)

(73) Assignee: AccuWeather, Inc., State College, PA (US)

( * ) Notice: Subject to any disclaimer, the term of this patent is extended or adjusted under 35 U.S.C. 154(b) by 0 days.

(21) Appl. No.: 15/455,390

(22) Filed: Mar. 10, 2017

(65) Prior Publication Data
US 2017/0249056 A1 Aug. 31, 2017

Related U.S. Application Data

(63) Continuation of application No. 15/510,065, filed as application No. PCT/US2014/055004 on Sep. 10, 2014, now abandoned.

(51) Int. Cl.
*G01W 1/06* (2006.01)
*G06F 16/9537* (2019.01)
(Continued)

(52) U.S. Cl.
CPC .......... *G06F 16/9537* (2019.01); *G01W 1/06* (2013.01); *G06F 16/22* (2019.01); *G06F 16/248* (2019.01);
(Continued)

(58) Field of Classification Search
CPC .. G06F 16/9537; G06F 16/2455; G01W 1/10; G01W 2203/00; Y02A 90/10
See application file for complete search history.

(56) References Cited

U.S. PATENT DOCUMENTS

| | | |
|---|---|---|
| 5,331,330 A | 7/1994 | Susnjara |
| 6,177,873 B1 * | 1/2001 | Cragun ................... G01W 1/00 340/601 |

(Continued)

FOREIGN PATENT DOCUMENTS

| | | |
|---|---|---|
| JP | 200510166 A | 1/2005 |
| JP | 2006520497 A | 9/2006 |

(Continued)

OTHER PUBLICATIONS

H. Bloemink, "Static Electricity Measurements for Lightning Warnings—An Exploration"; Royal Netherlands Meteorological Institute; De Bilt, 2013; pp. 1-23.

(Continued)

*Primary Examiner* — Nhat Huy T Nguyen
(74) *Attorney, Agent, or Firm* — Perkins Coie LLP

(57) ABSTRACT

A system and method for outputting weather data associated with a user-specified location based on a user-specified weather inquiry, including weather data output based on user-specified weather conditions, locations output based on a user-specified weather inquiry, notifications output regarding weather-related warnings, and notifications output based on weather-related notification thresholds.

20 Claims, 15 Drawing Sheets

(51) Int. Cl.
  *G06F 16/29* (2019.01)
  *G06F 16/22* (2019.01)
  *G06F 16/248* (2019.01)
  *G06F 16/2455* (2019.01)
  *G06F 3/04847* (2022.01)

(52) U.S. Cl.
  CPC .......... *G06F 16/2455* (2019.01); *G06F 16/29* (2019.01); *G06F 3/04847* (2013.01); *Y02A 90/10* (2018.01)

(56) References Cited

U.S. PATENT DOCUMENTS

| | | |
|---|---|---|
| 7,016,785 B2 | 3/2006 | Makela et al. |
| 7,058,510 B2 | 6/2006 | Kelly |
| 7,080,018 B1 | 7/2006 | Fox et al. |
| 7,084,775 B1 | 8/2006 | Smith |
| 7,181,345 B2 | 2/2007 | Rosenfeld et al. |
| 7,254,484 B2 | 8/2007 | Jantunen |
| 7,461,137 B2 | 12/2008 | Ryan et al. |
| 7,515,087 B1 | 4/2009 | Woodell |
| 7,751,978 B1 | 7/2010 | Neilley et al. |
| 7,869,953 B1 | 1/2011 | Kelly |
| 8,588,821 B1 | 11/2013 | Hewinson |
| 8,990,333 B2 | 3/2015 | Johnson et al. |
| 9,306,811 B2 | 4/2016 | Watts |
| 9,459,117 B2 | 10/2016 | Baig |
| 2001/0030624 A1 | 10/2001 | Schwoegler |
| 2003/0107490 A1 | 6/2003 | Sznaider et al. |
| 2004/0043760 A1* | 3/2004 | Rosenfeld ............... H04L 67/16 455/414.3 |
| 2005/0197776 A1 | 9/2005 | Makela et al. |
| 2005/0258971 A1 | 11/2005 | Greenstein et al. |
| 2006/0022346 A1 | 2/2006 | Tummala |
| 2006/0036366 A1 | 2/2006 | Kelly |
| 2007/0073841 A1 | 3/2007 | Ryan et al. |
| 2007/0088504 A1 | 4/2007 | Jantunen et al. |
| 2007/0162328 A1 | 7/2007 | Reich |
| 2009/0210353 A1 | 8/2009 | Mitchell et al. |
| 2009/0247116 A1 | 10/2009 | Sennett et al. |
| 2010/0238179 A1 | 9/2010 | Kelly |
| 2011/0004511 A1 | 1/2011 | Reich |
| 2011/0054776 A1 | 3/2011 | Petrov et al. |
| 2011/0062968 A1 | 3/2011 | Renno et al. |
| 2011/0099065 A1 | 4/2011 | Georgis et al. |
| 2011/0128144 A1 | 6/2011 | Baron, Sr. et al. |
| 2012/0274484 A1* | 11/2012 | Zimmer ............... G08G 5/0013 340/945 |
| 2013/0009906 A1 | 1/2013 | Posamentier |
| 2014/0203940 A1* | 7/2014 | Bonner .................. G08B 21/24 340/601 |
| 2015/0042479 A1 | 2/2015 | Muetzel |
| 2015/0256277 A1* | 9/2015 | Johnson .................. H04L 67/26 340/601 |
| 2015/0309895 A1* | 10/2015 | Tanimoto ............... H04L 67/22 714/4.11 |
| 2016/0148100 A1* | 5/2016 | Chang .................. H04W 4/029 706/12 |

FOREIGN PATENT DOCUMENTS

| | | |
|---|---|---|
| JP | 2011526709 A | 10/2011 |
| JP | 2013147131 A | 8/2013 |
| JP | 2017142855 A | 8/2017 |
| KR | 10-2005-0089255 | 9/2005 |
| KR | 10-0782122 B1 | 12/2007 |
| KR | 10-2009-0108454 | 10/2009 |
| KR | 10-2011-0018015 | 2/2011 |
| KR | 10-2013-0089762 | 8/2013 |
| MY | 135780 A | 6/2008 |
| WO | WO-0237332 A2 | 5/2002 |
| WO | WO-2004036476 A1 | 4/2004 |
| WO | WO-2007042600 A1 | 4/2007 |

OTHER PUBLICATIONS

Notification Concerning Transmittal of International Preliminary Report on Patentability issued in PCT/US2014/055004 dated Mar. 14, 2017.
International Search Report for PCT/US2015/040697 dated Nov. 23, 2015, 3 pages.
J.L. Levere; "Cruise Ship Campaign Aims at Vacationers Tired of Snow", <http://www.nytimes.com/2004/12/28/business/media/28adco.html?_r=0>; 3 pages.
H. Thomases; "Rain or Shine, Weather-Triggered Advertising Is Fine"; 3 pages<http://www.clickz.com/clickz/column/1710140/rain-shine-weather-triggered-advertising-is-fine>.
English translation; Japanese Published Application No. 2017142855; Publication Date: Aug. 17, 2017; 57 pages.
Chapter 6 Web & Useful Information, Readily Available and Easy PLUS Android Applications Perfect Dictionary, 2014 version. Japan, Technology Review Co., Ltd., Mar. 5, 2014, pp. 125-148 (newly cited reference).

* cited by examiner

FIG. 4A

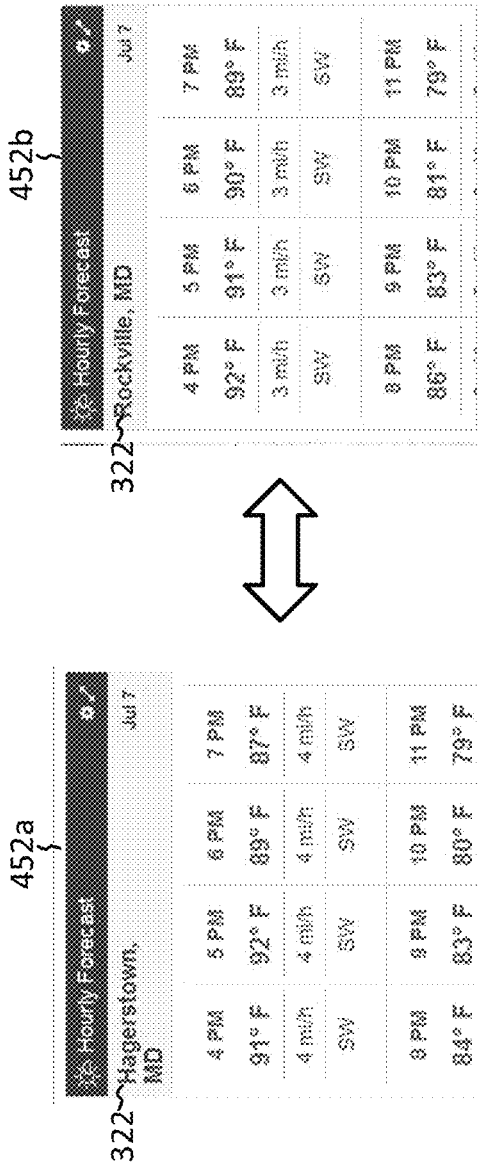

CUSTOMIZABLE WEATHER ANALYSIS SYSTEM FOR OUTPUTTING USER-SPECIFIED PROCEDURES IN RESPONSE TO WEATHER-RELATED WARNINGS

CROSS-REFERENCE TO RELATED APPLICATIONS

This application is continuation of U.S. patent application Ser. No. 15/510,065, filed Mar. 9, 2017, which claims the benefit of International Application PCT/US2014/005504, filed on Sep. 10, 2014, the content of both which is incorporated by reference herein.

BACKGROUND

Without advanced warning, severe weather may pose both financial and safety risks to businesses and organizations. On the other hand, accurate and reliable forecasts of both mild and severe weather conditions provide organizations with a competitive advantage by enabling better logistical planning and better ability to anticipate customer need. As industries and organizations expand across the world, it has proved increasingly challenging to monitor hundreds or thousands of ever-changing locations. Furthermore, organizations may wish to monitor weather conditions of mobile employees. Tracking such a quantity of data can overwhelm even the most highly staffed and technologically savvy organization.

Conventional systems allow organizations to enter into an agreement with a weather forecasting company to monitor weather conditions and weather-related warnings at locations of interest to those organizations. Conventional methods, however, require the organization to contact the weather forecasting company to specify the weather conditions, weather-related warnings, and locations of interest to the organization. If the geographic scope of the organization changes, or if the organization wishes to change the weather conditions or warnings of interest, conventional methods require the organization to re-contact the weather forecasting company so the weather forecasting company may make the necessary changes. The inefficiencies in conventional methods prevent dynamic organizations from quickly and efficiently receiving the information they need to minimize financial and safety risks, improve logistics, and better anticipate customer need.

SUMMARY

In order to overcome these and other disadvantages in the related art, there is provided a customizable weather analysis system and method for outputting weather data associated with user-specified locations based on user-specified weather inquiries. The system may output weather data based on the user-specified locations, user-specified weather conditions and thresholds, weather-related warnings, and/or user-specified time frames. The weather data may be output by a graphical user interface via user-selected modules. The system may also output notifications based on weather-related warnings or user-specified weather-related notification thresholds. The notifications may include user-specified procedures. The procedures may be user-specific, user-role specific, location-specific, and/or warning specific. If a weather-related warning regarding a severe weather condition is issued, the system may also output a null warning if the severe weather condition is unlikely to impact a user-specified location. The system may also enable users to acknowledge the notifications and null warnings and enable other users to view whether or not those notifications have been acknowledged. The system may also enable users to define queries and determine which of the user-specified locations satisfy the user-defined queries. The system may also allow users to receive custom-designed inputs and/or recommended business action steps from the system defined in terms of business variables, for which weather provides a component of the analysis.

The customizable weather analysis system and method enables users to input and modify the user-specified locations and the user-specified weather inquiries (including the user-specified weather conditions, the weather-related warnings of interest, the user-specified time frames, the user-selected modules, the user-specified notification thresholds, and the user-defined queries) via a graphical user interface.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

FIGS. 4A through 4C illustrate dashboard views of the graphical user interface according to exemplary embodiments of the present invention;

FIGS. 5A-B and 6A-B illustrate rotating-content modules which may be output by the graphical user interface according to exemplary embodiments of the present invention;

DETAILED DESCRIPTION OF THE INVENTION

Figure 1:
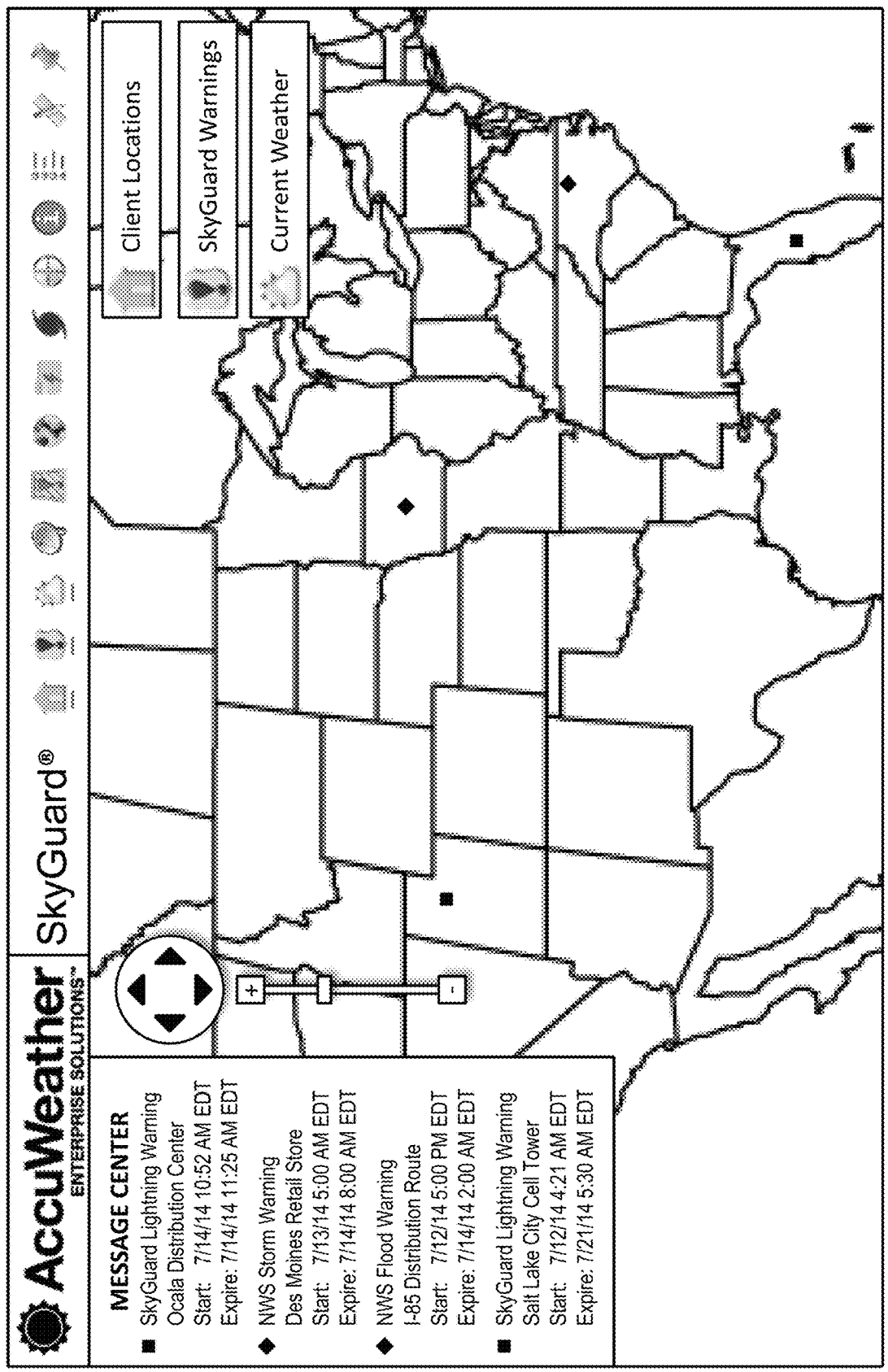
FIG. 1 illustrates a map view of a graphical user interface output by a system according to an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 illustrates a map view of a graphical user interface (GUI) output by a system 200 according to an exemplary embodiment of the present invention.

As described below, the system 200 enables users to minimize weather-related safety and financial risks by outputting weather-related warnings and notifications when weather-related events threaten locations of interest to the user. The system 200 also provides users with a competitive advantage by providing current, historical, and forecasted weather information regarding conditions (both mild and severe and both favorable and unfavorable) affecting locations of interest to the user and allowing users to create and disseminate response procedures associated with these conditions.

Figure 2:
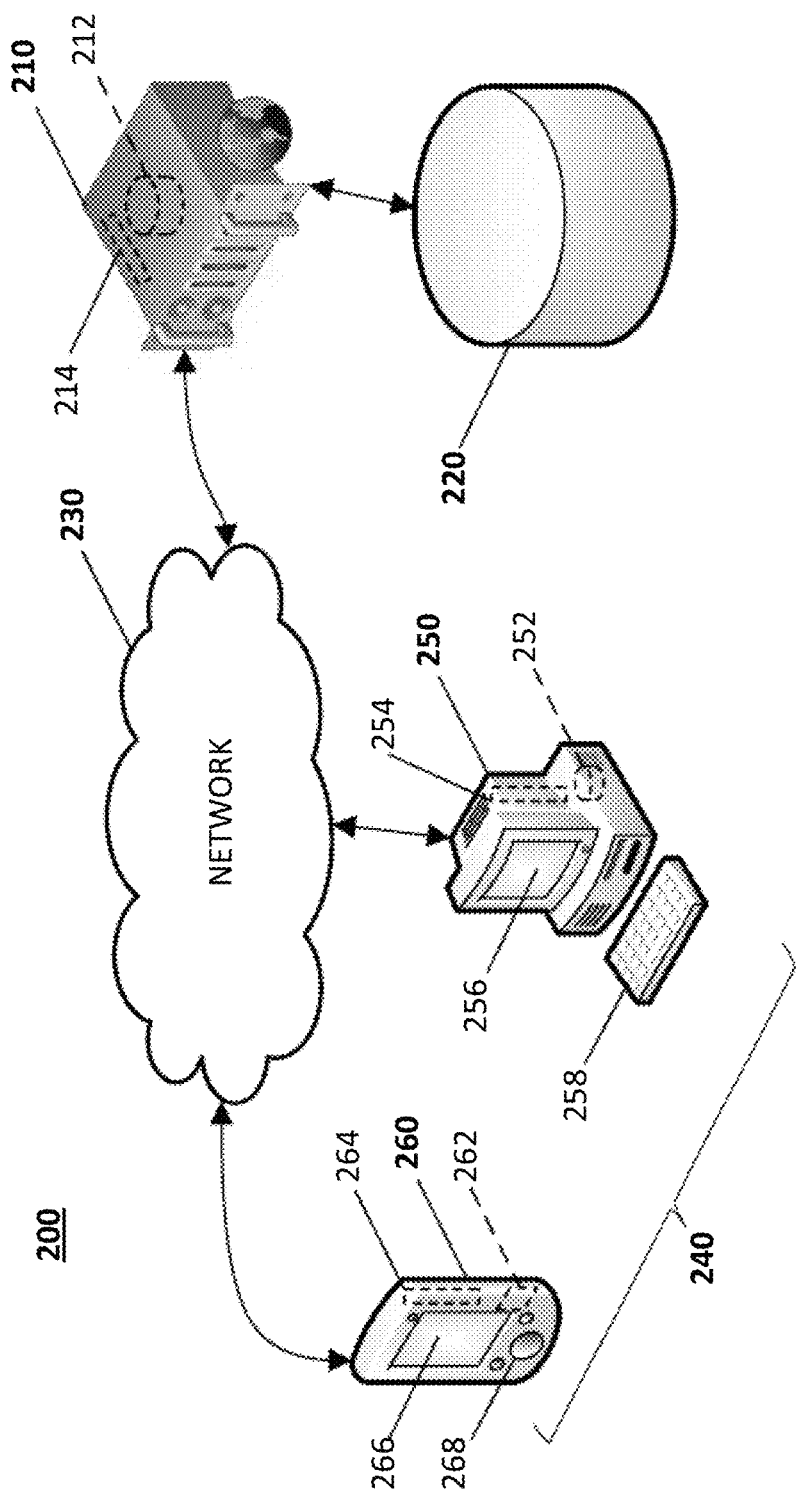
FIG. 2 is a diagram overview of the system according to an exemplary embodiment of the present invention.

FIG. 2 illustrates an overview of the system 200. The system 200 may include one or more servers 210 and one or more databases 220 connected to a plurality of remote computer systems 240, such as one or more personal systems 250 and one or more mobile computer systems 260, via a network 230.

The one or more servers 210 may include an internal storage device 212 and a processor 214. The one or more servers 210 may be any suitable computing device including, for example, an application server and a web server which hosts websites accessible by the remote computer systems 240. The one or more databases 220 may be internal to the server 210, in which case they may be stored on the internal storage device 212, or it may be external to the server 212, in which case it may be stored on an external non-transitory computer-readable storage medium, such as an external hard disk array or solid-state memory. The one or more databases 220 may be stored on a single device or multiple devices. The network 230 may include any combination of the internet, cellular networks, wide area networks (WAN), local area networks (LAN), etc. Communication via the network 230 may be realized by wired and/or wireless connections. A remote computer system 240 may be any suitable electronic device configured to send and/or receive data via the network 230. A remote computer system 240 may be, for example, a network-connected computing device such as a personal computer, a notebook computer, a smartphone, a personal digital assistant (PDA), a tablet, a notebook computer, a portable weather detector, a global positioning satellite (GPS) receiver, network-connected vehicle, etc. A personal computer systems 250 may include an internal storage device 252, a processor 254, output devices 256 and input devices 258. The one or more mobile computer systems 260 may include an internal storage device 262, a processor 264, output devices 266 and input devices 268. An internal storage device 212, 252, and/or 262 may be non-transitory computer-readable storage mediums, such as hard disks or solid-state memory, for storing software instructions that, when executed by a processor 214, 254, or 264, carry out relevant portions of the features described herein. A processor 214, 254, and/or 264 may include a central processing unit (CPU), a graphics processing unit (GPU), etc. A processor 214, 254, and 264 may be realized as a single semiconductor chip or more than one chip. An output device 256 and/or 266 may include a display, speakers, external ports, etc. A display may be any suitable device configured to output visible light, such as a liquid crystal display (LCD), a light emitting polymer displays (LPD), a light emitting diode (LED), an organic light emitting diode (OLED), etc. The input devices 258 and/or 268 may include keyboards, mice, trackballs, still or video cameras, touchpads, etc. A touchpad may be overlaid or integrated with a display to form a touch-sensitive display or touchscreen.

The system 200 may be used by a single user or multiple users simultaneously. The system 200 may be realized by software instructions accessible to and executed by the server 210 and/or downloaded and executed by the remote computing system 240. As used herein, the term "users" may refer to individuals, organizations, or entities. As used herein, the terms "user-specified" or "user-defined" and the like may refer to any information input by a user or determined by the system 200 based on other information input by a user. Because a user of the system may be an organization, the system may output information to one individual user based on a "user-specified" or "user-defined" value that was specified or defined by a different individual user. In other words, as used herein, the system 200 may output information to a first user based on a "user-specified" value that was specified by a second user.

The graphical user interface of the system 200 includes a map view, similar to the map view 100 illustrated in FIG. 1. The map view 100 may enable users to view satellite imagery, street-level maps, topographic information, terrain information, etc. The system 200 may enable users to overlay radar and infrared satellite imagery, as well as visual representations of current, historical, and forecasted sky conditions, surface conditions, public warnings, SkyGuard warnings, lightning strikes, local storm reports, hurricane impact forecasts, wildfire information, and earthquakes on the geographic region shown in the map view 100.

The radar and infrared satellite imagery available to the user may include data or imagery available from, for example, the U.S. National Radar Mosaic, Environment Canada, local radar from individual radar sites, U.S. infrared satellite, world infrared satellite, etc.

The current, historical, and forecasted sky conditions may indicate, for example, whether the sky is partly cloudy, cloudy, rainy, partly sunny, etc. The system 200 may also differentiate between daytime sky conditions and overnight sky conditions. The sky condition information may be provided, for example, by AccuWeather.

The current, historical, and forecasted surface conditions may include temperatures, precipitation, humidity, ultraviolet index, wind gusts, and sustained winds at fixed locations. The surface condition information may be provided, for example, by the AccuWeather Universal Current Conditions database, the Meteorological Assimilation Data Ingest System (MADIS), etc.

The public warnings may be issued, for example, by the National Weather Service (NWS), Environment Canada, etc. The system 200 may enable users to view the warning type, start and end time, and access full warning text in the map view 100. The public warnings issued by the NWS and available on the map view 100 may include river river flood warnings, thunderstorm watch boxes, tornado watch boxes, mesoscale discussions, polygon warnings, zone/country warnings, etc. The NWS warnings may include outlooks, advisories, watches, warnings, special weather statements, etc. The public warnings issued by Environment Canada may include areas of impact (such as the region or subregion), natural disasters (such as dust storms, hurricane, storm surges, etc.), severe weather (such as rainfall, severe thunderstorms, tornados, high winds, etc.), winter weather (such as blizzards, extreme temperatures, freeze, frost, snow squalls, winter storms, etc.).

The SkyGuard warnings may include, for example, warnings issued by meteorologists from AccuWeather Enterprise Solutions, Inc. to provide notification of extreme weather events according to specific critical thresholds such as temperature, precipitation, winds, lightning strikes, etc. The SkyGuard warnings may be visually represented at the location or region predicted to be affected by the event. The map view 100 may be configured to output only the Sky-Guard warnings affecting user-specified locations or user-specified critical locations. The system 200 may enable the user to view details regarding each warning, such as start time, expire time, user-specified location, condition (lightning, thunderstorm, heavy rain, high wind, high temperature, etc.) and comments from a SkyGuard meteorologist, as well as pre-determined or user-supplied information specific to each location (e.g., the contact information for local management or emergency response personnel, etc.). Sky-Guard lightning warnings may also include visual representations of "lightning rings" (i.e., radius rings that conform to the distance used for SkyGuard lightning warnings).

The lightning strikes may include, for example, cloud-to-cloud and cloud-to-ground lightning strikes. The lightning strikes may be visualized in real time or near-real time. The lightning strike data may be, for example, from the Vaisala's National Lightning Detection Network (NLDN).

The local storm reports may include, for example, reports from spotters such as law enforcement personnel, emergency dispatchers, emergency management officials, firefighters, emergency medical technicians, storm chasers, and other individuals. Local storm reports, for example, may detail weather-related events such as tornadoes, severe thunderstorms, high winds, lightning-related damage, snowfall, ice amounts, etc. The system 200 may enable a user to view details regarding the local storm reports, for example, the category, event type, report date and time, magnitude of event, the observation location (city, county, and state) and the remarks provided by the spotter. The map view 100 may visualize the local storm reports close to or at the longitude and latitude of the location of the event. The local storm reports may be collected and distributed, for example, by the National Weather Service.

The earthquakes may be visually represented at the longitude and latitude of the epicenters. The system 200 may be configured to display earthquakes with magnitudes greater than a user-specified or pre-programmed threshold (for example, 4.0 or greater). The system 200 may enable users to view details of the earthquakes, such the date and time of occurrence, the latitude and longitude of the epicenter, the depth, and the magnitude. The earthquake data may be provided, for example, by the US Geological Survey (USGS).

The wildfire information may include current perimeter locations, hotspots, recent communications to and from firefighters, etc. The wildfire information may be displayed or conveyed on the interactive map or by other means. The wildfire information may be conveyed in real time, near real time, or recent summary with and without trending. The wildfire information may be combined with estimates or measurements of fuel loading by location(s) and actual or projected wind speeds, wind velocity, elevation, precipitation, etc. Communications to and from firefighters may be conveyed as text converted from voice or as the actual voice communications (for example, via an embedded audio player).

The hurricane impact forecasts may include the current locations of storms, forecast points for storms, the time when storms are expected to reach certain locations, the track line between forecast points, potential areas where the hurricanes may travel, hurricane wind radii (i.e., the extent of hurricane force winds (74 mph) from the center of storms), the tropical storm wind radii (i.e., the extent of tropical storm force winds (39 mph) from the center of the chosen storms), the U.S. and international tropical watches and warnings in effect, probabilities of hurricane force winds, forecasts for storm surges at the coastline of tropical systems making landfall, rainfall potentials, forecasts for risks to lives and property over a specified period (e.g., a 24-hour period beginning at the forecast times of storms), maximum sustained winds, maximum wind gusts. The hurricane impact forecasts may be provided, for example, by AccuWeather. The system 200 may also provide, for example, the current position and the forecast points from the National Hurricane Center (NHC) or other tropical cyclone forecasting centers, including graphic visualizations of a plurality of forecast tracks from various forecasting models.

Figure 3:
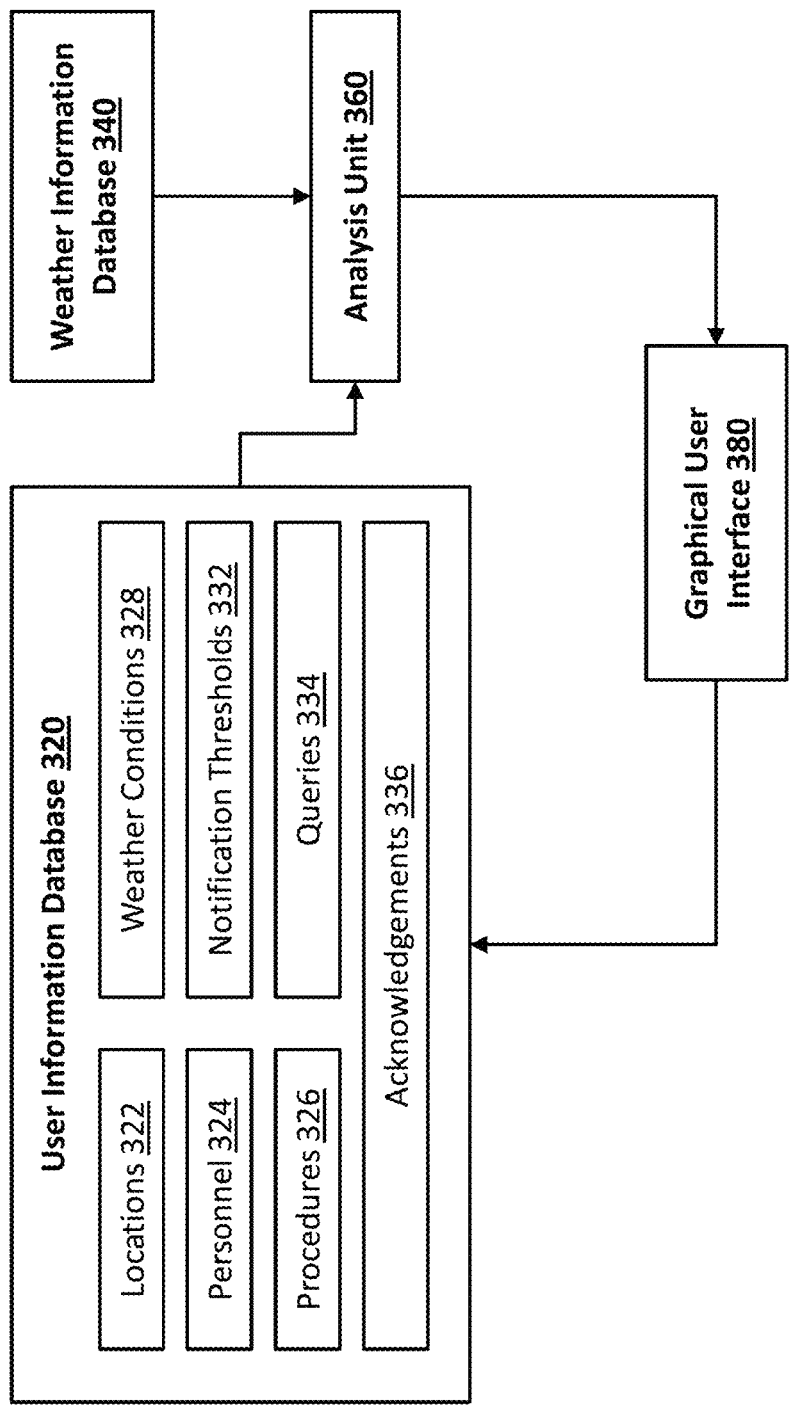
FIG. 3 is a block diagram of the system illustrated in FIG. 2 according to an exemplary embodiment of the present invention.

FIG. 3 is a block diagram of the system 200 according to an exemplary embodiment of the present invention. The system 200 may include a user information database 320, a weather information database 340, an analysis unit 360, and a graphical user interface 380. The user information database 320, the weather information database 340, the analysis unit 360 and/or the graphical user interface 380 may be co-located or remotely located. The user information database 320 may include user-specified locations 322, personnel 324, procedures 326, weather conditions 328, notification thresholds 332, and queries 334, as well as acknowledgements 336 received from the user-specified personnel 324. The locations 322, personnel 324, procedures 326, weather conditions 328, notification thresholds 332, and queries 334 may be specified by the users via the graphical user interface 380. The user information database 320 may be any organized collection of information, whether stored on a single tangible device or multiple tangible devices. The user information database 320 may be realized, for example, as one of the databases 220 illustrated in FIG. 2.

The weather information database 340 includes information regarding current, historical (past), and forecasted (future) weather conditions and weather-related warnings. The weather data and weather-related warning data may be received, for example, from AccuWeather, Inc., AccuWeather Enterprise Solutions, Inc., the National Weather Service (NWS), the National Hurricane Center (NHC), Environment Canada, other governmental agencies (such as the U.K. Meteorologic Service, the Japan Meteorological Agency, etc.), private companies (such as Vaisalia's U.S. National Lightning Detection Network, Weather Decision Technologies, Inc.), individuals (such as members of the Spotter Network), etc. The weather information database may also include information regarding natural hazards (such as earthquakes) received from, for example, the U.S. Geological Survey (USGS). The weather information database 340 may be any organized collection of information, whether stored on a single tangible device or multiple tangible devices. The weather information database 340 may be realized, for example, as one of the databases 220 illustrated in FIG. 2.

As used herein, "weather conditions" may include, for example, the 24-hr maximum temperature, the 24-hr minimum temperature, the air quality, the amount of ice, the amount of rain, the amount of snow falling in a user-specified or pre-determined time period, the amount of snow on the ground, the AO [Arctic Oscillation], the average relative humidity, the barometric pressure trend, the blowing snow potential, the ceiling, the ceiling height, the chance of a thunderstorm, the chance of enough snow to coat the ground, the chance of enough snow to wet a field, the chance of hail, the chance of ice, the chance of precipitation, the chance of rain, the chance of snow, the cloud cover, the cloud cover percentage, the cooling degrees, the day sky condition icon, the day wind direction, the day wind gusts, the day wind speed, the dew point, the ENSO [El Nino Southern Oscillation], the evapotranspiration, the expected thunderstorm intensity level, the flooding potential, the heat index, the heating degrees, the high temperature, the high tide warning, the high wet bulb temperature, the highest relative humidity, the hours of ice, the hours of precipitation, the hours of rain, the hours of snow, the humidity, the lake levels, the liquid equivalent precipitation amount, the low temperature, the low wet bulb temperature, the maximum UV index, the MEI [Multivariate ENSO Index], the MJO [Madden-Julian Oscillation], the moon phase, the moonrise, the moonset, the night sky condition icon, the night wind direction, the night wind gusts, the night wind speed, the normal low temperature, the normal temperature, the one-word weather, the precipitation amount in inches, the precipitation accumulation, the precipitation type, the probability of snow, the probability of enough ice to coat the ground, the probability of enough snow to coat the ground, the probability of enough rain to wet a field, the rain amount, the RealFeel®, the RealFeel® high, the RealFeel® low, the record low temperature, the record high temperature, the relative humidity range, the sea level barometric pressure, the sea surface temperature, the sky condition icon, the snow accumulation in the next 24 hours, the solar radiation, the station barometric pressure, the sunrise, the sunset, the temperature, the type of snow, the UV index, the visibility, the wet bulb temperature, the wind chill, the wind direction, the wind gusts, the wind speed, etc.

Each weather condition may be expressed based on a time frame. As used herein, a "time frame" associated with a weather condition may include the current value, the daily value, the hourly forecast value, the daily forecast value, the daily value one year ago, the accumulation or variations over a previous time period (e.g., 24 hours, 3 hours, 6 hours, 9 hours, the previous day, the past seven days, the current month to date, the current year to date, the past 12 months), the climatological normal (e.g., the average value over the past 10 years, 20 years, 25 years, 30 years, etc.), the forecasted accumulation over a future time period (e.g., 24 hours), etc.

The weather-related warnings, as described above, may include river flood warnings, thunderstorm watch boxes, tornado watch boxes, mesoscale discussions, polygon warnings, zone/country warnings, outlooks, advisories, watches, special weather statements, lightning warnings, thunderstorm warnings, heavy rain warnings, high wind warnings, high or low temperature warnings, local storm reports, earthquakes, and/or hurricane impact forecasts The analysis unit 360 may be realized by software instructions accessible to and executed by the server 210 and/or downloaded and executed by the remote computer systems 240. The analysis unit 360 is configured to receive information from the user information database 320 and the weather information database 340. As described below, the analysis unit 360 may be configured to output current, historical, and/or forecasted weather information to the graphical user interface 380 via the network 230 based on the user-specified weather conditions 328, queries 334 and/or locations 322. The analysis unit 360 may also be configured to output weather-related notifications based on the user-specified notification thresholds 332 and/or locations 322. The analysis unit 360 may further be configured to output weather-related warnings and user-specified procedures 326 to user-specified personnel 324 and receive and store acknowledgements 336 from the user-specified personnel 324.

The graphical user interface 380 may be any interface configured to receive the user-specified locations 322, personnel 324, procedures 326, weather conditions 328, notification thresholds 332, or queries 334 and/or output the current, historical, and/or forecasted weather information or weather related-notifications. The graphical user interface may include a responsive site design that allows content to be displayed on any web browser-enabled internet-connected device (e.g., a laptop, tablet, smart phone, etc.) of any brand running any operating system. Alternatively, the graphical user interface 380 may include multiple embodiments customized based on the type of computing device and/or the screen size of the remote computer system 240. For example, the graphical user interface 380 may include one embodiment customized for a remote computer system 240 such as a personal computer and another embodiment customized for a mobile computer system 260 such as a smart phone.

The user-specified locations 322 may be facility locations, geographic areas (such as cities, counties, or other user-defined shapes), segments (such as roads, railway lines, or other direct or indirect paths between two or more geographic locations), etc. The user-specified locations 322 may also include the real time (or near-real time) locations of the mobile computer systems 260, such as personal computers, notebook computers, smartphones, personal digital assistants (PDAs), tablets, notebook computers, portable weather detectors, global positioning satellite (GPS) receivers, and/or a network-connected vehicles such as automobiles, commercial trucks, trains, aircraft, watercraft, etc. The locations of the mobile computer systems 260 may be determined automatically, repeatedly, continuously, and/or regularly (i.e., at pre-determined intervals), for example, by a location detection unit such as GPS and output to the database 220 via the network 220. The locations of a mobile computer system 260 may also be determined based on a scheduled location of a vehicle associated with the mobile computer system 260. For example, a vehicle such as a train may be scheduled to travel a specified route over a specified time. The database 220 may store the predetermined route of a mobile computer system 260 integrated with or carried separately aboard the train. Accordingly, the location 322 of the mobile computer system 260 may be determined based on the scheduled location of the train.

When the mobile computer system 260 is paired with a vehicle, the system 200 may be configured to interrupt the radio within the vehicle to output weather-related information, to display the weather-related information within the vehicle, and/or to transmit the weather-related information to the mobile communication device 260 within the vehicle either through the wireless network connection of the vehicle or the mobile computer system 260. In each instance, the location 322 of the vehicle and its occupants and/or cargo are tracked and related to weather in real time or near real time.

The system 200 may be configured to output weather-related information based on a user-specified accuracy level. For example, the system 200 may be configured to output highly accurate notifications based on the current or forecasted weather data and the current or anticipated location 322 of a remote computer system 240. In another example, the system 200 may be configured to output weather-related information based on criteria selected in advance by a user or other participant (such as a car company, telematics delivery partner, etc). For instance, a mobile computer system 260 paired with a vehicle may receive a notification when current or forecasted wind gusts in the current or anticipated location 322 of the vehicle are such that the system 200 anticipates that driving that particular vehicle with a minimum load is dangerous. In another example, the system 200 may be configured to output public warnings in response to a determination that the location 322 of a remote computer system 240 is within the geographic area of the public warning. In another example, the system 200 may be configured to output notifications based on public warnings that have been modified or improved by the system 200 or by professional meteorologists such as AccuWeather Enterprise Solutions, Inc. The public warnings may be modified or improved by providing more accurate weather-related information or more accurate geographic information (i.e., providing a smaller, more specific geographic area that is likely to be impacted by a weather event).

The system 200 may also enable users to group the user-specified locations 322 into user-specified categories (for example, via the graphical user interface 380). For example, a user may group retail stores in one category and distribution centers in another category. Each location 322 (or all locations 322 in a user-specified category) may be identified by the user as critical or non-critical. As described below, critical locations 322 may be monitored (for example, by the system 200 and/or by a professional meteorologist) so that the system 200 may output a weather-related warning to user-specified personnel 324 in the event of a potential for severe weather at a critical location 322. In that same example, the system 200 may not output a weather-related warning if the user-specified location is non-critical.

User-Specified Forecasts

Figure 4A:
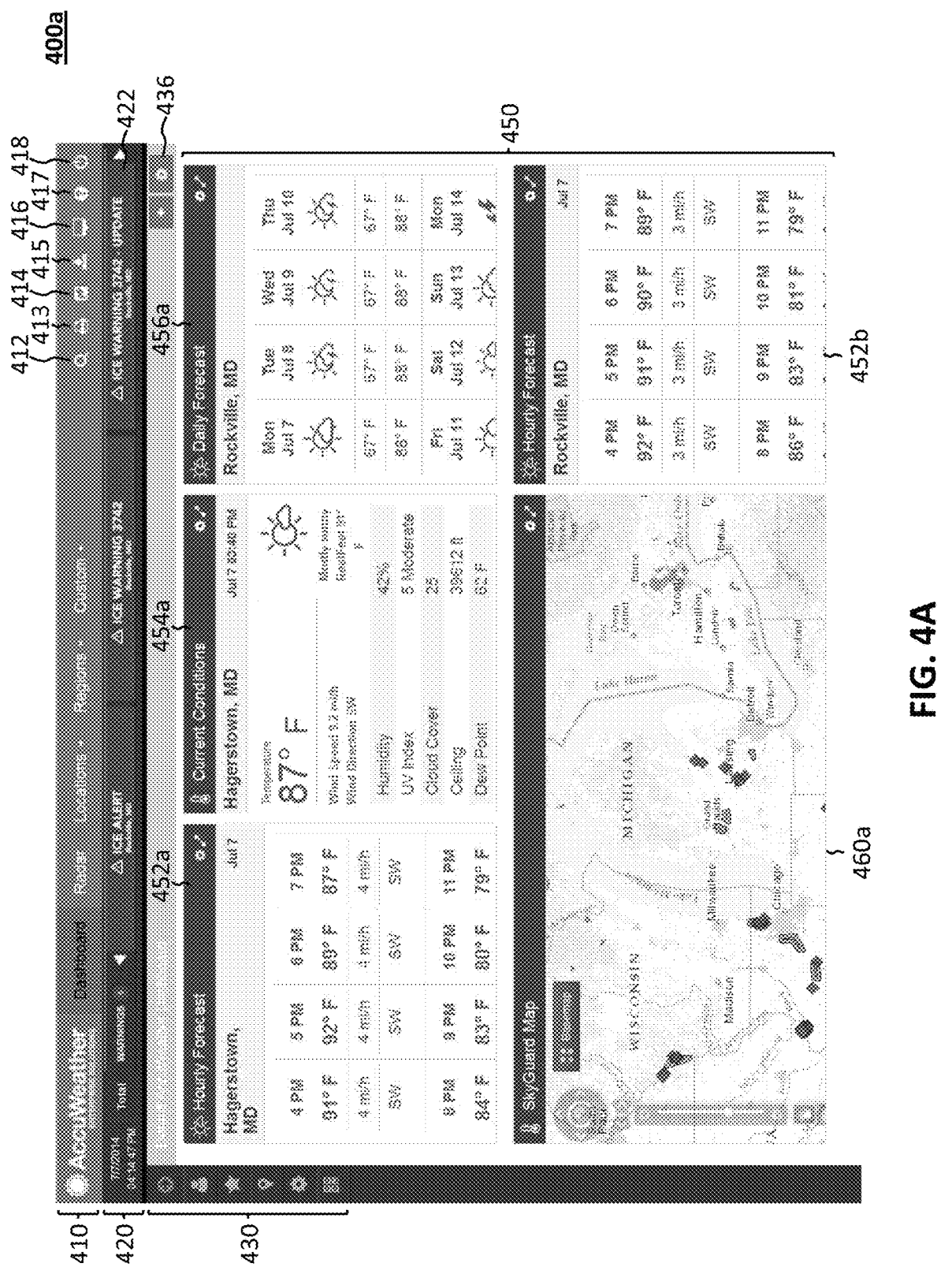

FIG. 4A illustrates a dashboard view 400a of the graphical user interface 380 according to an exemplary embodiment of the present invention. The dashboard view may include a navigation bar 410, a notification bar 420, a sidebar 430, icons 436 for adding a module and modifying dashboard settings, a plurality of modules 450.

The navigation bar 410 may include search icon 412, a print icon 413, a share icon 414, a download icon 415, a slideshow icon 416, help icon 417, and an account icon 418. The search icon 412 may enable a user to search for keywords in tables and discussions. The print icon 413 may enable a user to output some or all of the information currently displayed by the graphical user interface 382 to an external printer or file conversion program. The share icon 414 may enable the user to output some or all of the information displayed by the graphical user interface 382 to an external program such as e-mail or a social networking service. The download icon 415 may enable a user to download some or all of the information displayed by the graphical user interface 382. The slideshow icon 416 may enable a user to view some or all of the content display by the graphical user interface 382 as a slideshow. The help icon 417 may enable a user to obtain content prepared to assist the user while operating the system 200. The notification bar 420 may include visual indications 422 of textual notifications. Textual notifications, as described below, may be output by the analysis unit 360 in response to, for example, a weather related warning in a user-defined location 322.

The modules 450 enable a user to view-user specified weather conditions 328, including current, historical, and/or forecast weather conditions. The system 200 may be configured to enable users to select from a plurality of available modules. The modules 450 may include graphical representations, numerical representations, tables, charts, or in any other representation useful to a user. As illustrated in FIG. 4A, for example, the modules 450 may include hourly forecast modules 452a and 452b, a current conditions module 454a, a daily forecast module 456a, and a SkyGuard map module 460a. The SkyGuard map module 460a may include, for example, some or all of the features described above with reference to the map view 100 of FIG. 1.

The graphical user interface 380 enables users to view and compare the same user-specified weather conditions 328 in two or more locations 322 and/or two or more user-specified weather conditions 328 for the same location. As illustrated in FIG. 4A, for example, modules 452a and 452b output the hourly forecast for Hagerstown and Rockville, Md., while modules 456a and 452b output the daily and hourly forecasts Rockville, Md. As one of ordinary skill in the art would recognize, the system 200 may be configured such that the graphical user interface 380 highly customizable. For example, the graphical user interface 380 may enable users to view and compare the same user-specified weather conditions 328 in up to twenty user-specified locations 322 at once and/or up to three user-specified weather conditions 328 for the same user-specified location 322 at once. As described below, the system 200 may be configured such that up to 100 different modules 450 or more may be available to a user.

Figure 4B:
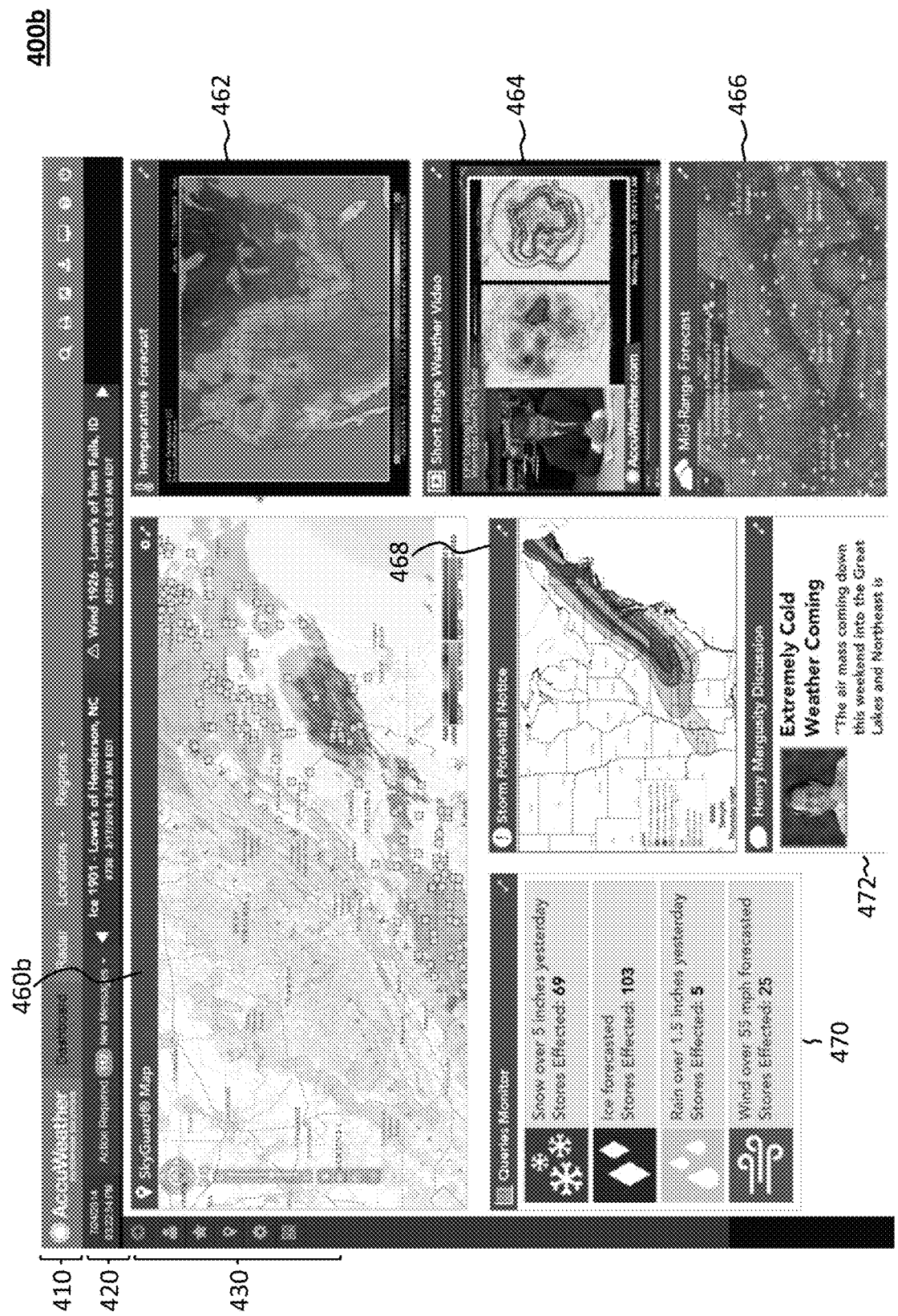

FIG. 4B illustrates a dashboard view 400b of the graphical user interface 380 according to an exemplary embodiment of the present invention. Similar to the dashboard view 400a, the dashboard view 400b may include the navigation bar 410, the notification bar 420, and the sidebar 430. Additionally, the dashboard view 400b may include a SkyGuard map module 460b, a weather condition map module 462, a video module 464, a mesoscale forecast map module 466, a storm potential notice module 468, a meteorologist's discussion module 472, and a queries module 470.

The SkyGuard map module 460b may be similar to the SkyGuard map module 460a. The weather condition map module 462 may be configured to output graphical representations of current and/or forecasted weather conditions overlaid on a map of the geographic areas experiencing or predicted to experience those variables. The video module 464 may be configured to output video, including motion pictures and/or graphics (e.g., featuring and/or prepared by professional meteorologists from AccuWeather, Inc., AccuWeather Enterprise Solutions, Inc., etc.). The mesoscale forecast map module 466 may be configured to output graphical representations of a mesoscale forecast overlaid on a map of the relevant geographic areas. The storm potential notice map module 468 may be configured to output graphical representations of a potential storm overlaid on a map of the geographic areas experiencing or predicted to experience the storm. The meteorologist's discussion module 472 may be configured to output content from professional meteorologists (e.g., from AccuWeather, Inc., AccuWeather Enterprise Solutions, Inc., etc.). The queries module 470, as discussed below with reference to FIG. 13, may be configured to output the results of user-defined queries 334.

Figure 4C:
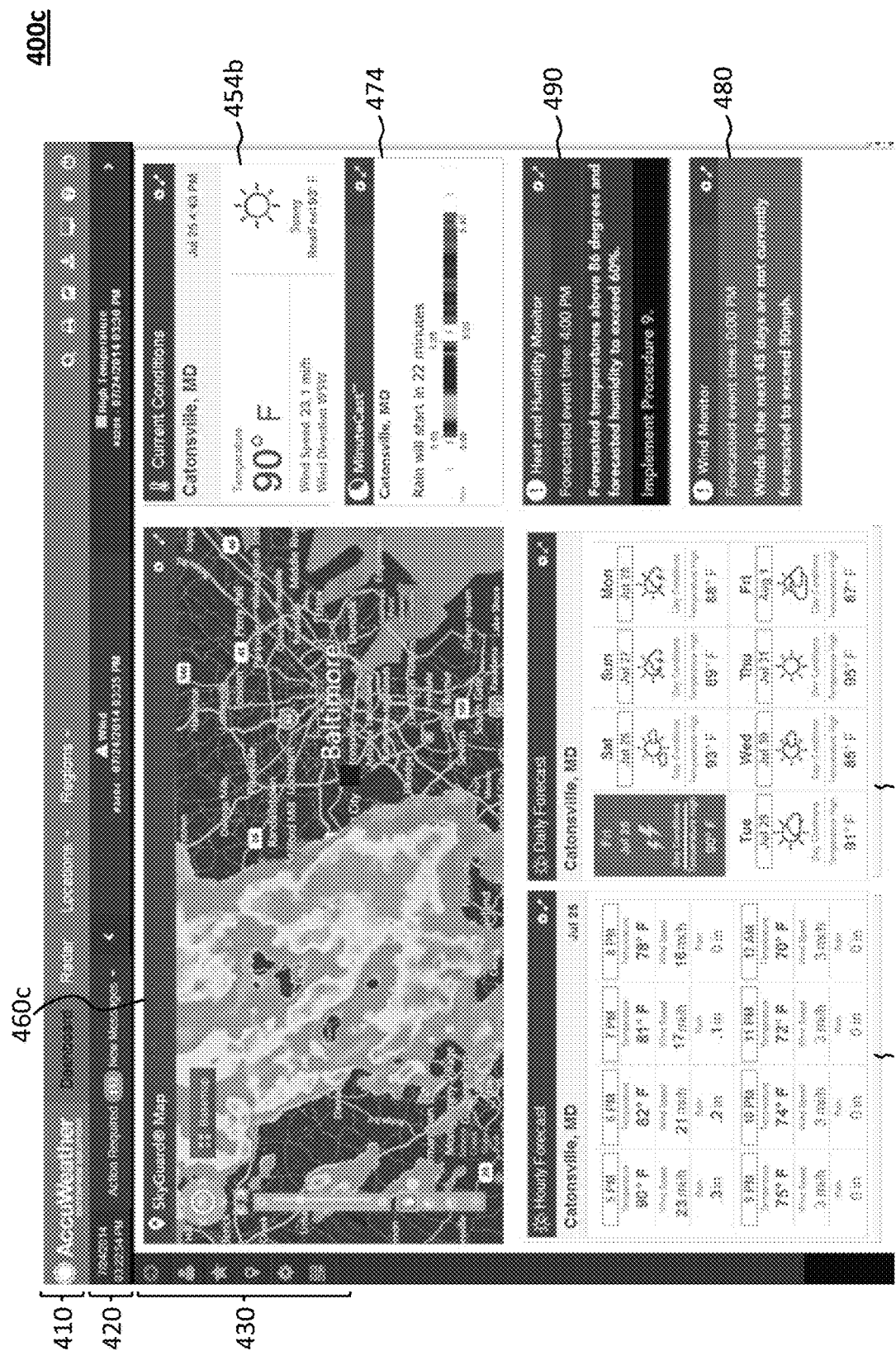
Figures 6A, 6B:
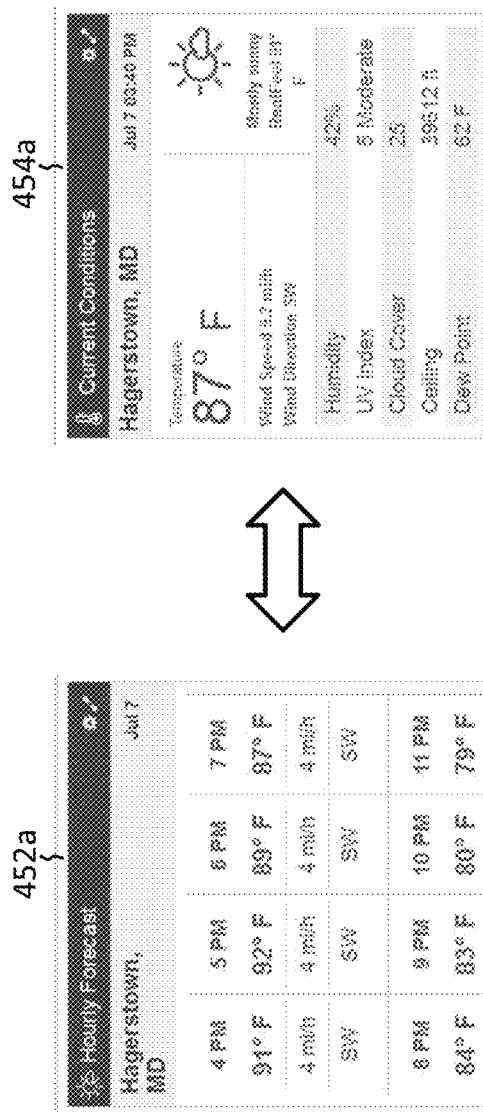

FIG. 4C illustrates a dashboard view 400c of the graphical user interface 380 according to an exemplary embodiment of the present invention. Similar to the dashboard views 400a and 400b, the dashboard view 400c may include the navigation bar 410, the notification bar 420, and the sidebar 430. Additionally, the dashboard view 400b may include a SkyGuard map module 460c, an hourly forecast module 452c, a current conditions module 454b, a daily forecast module 456b, a MinuteCast™ module 474, a procedure module 490, and a notification module 480. The SkyGuard map module 460c, the hourly forecast module 452c, the current conditions module 454b, and the daily forecast module 456b may be similar to the SkyGuard map modules 460a and 460b, the hourly forecast modules 452a and 452b, the current conditions module 454a, and the daily forecast module 456a, respectively. As discussed below with reference to FIGS. 9A through 9C, the daily forecast module 456b may include a notification of severe weather (for example, the daily forecast may be color coded as illustrated for Friday, July 25).

The MinuteCast™ module 474 may be configured to output a highly accurate forecast (e.g., in increments of 1 minute, 5 minutes, etc.) over a short time period (e.g., 1 hour, 2 hours, 4 hours, etc.). As discussed below with reference to FIG. 12, the notification module 480 may be configured to output a user-specified or pre-determined notification in response to a weather-related warning and/or a user-specified notification threshold 332. The procedure module 490 may be configured to output both a user-specified or pre-determined notification and a user-specified procedure 326 in response to a weather-related warning and/or a user-specified notification threshold 332.

The system 200 may be configured such that the notification modules 480 and/or the procedure modules 490 are color-coded to indicate whether the conditions are favorable or unfavorable. An indication of whether a condition is favorable or unfavorable may be user-specified and stored, for example, as part of the user-specified notification thresholds 332. The system 200 may also include pre-determined indications of whether conditions are favorable or unfavorable. As shown in FIG. 4C, for example, the procedure module 490 may be red to indicate that the conditions are unfavorable while the notification module 480 may be green to indicate that the conditions are favorable. The notification modules 480 and/or the procedure modules 490 may also include user-specified or pre-determined information to describe the weather conditions or a potential impact of the weather conditions (e.g., "Bridge Icing Probable").

The graphical user interface 380 may also include rotating content to enable users to view multiple user-specified locations 322 and/or user-specified weather conditions 328 and/or multiple user-specified time frames on the same portion of the screen over time. FIGS. 5A-5B and 6A-6B illustrate rotating-content modules according to exemplary embodiments of the present invention. The system 200 may be configured such that a portion of the graphical user interface 380 displays a plurality of modules 450 in the same area of the screen, each for a user-defined or pre-determined time. For example, the graphical user interface 380 may display FIG. 5A, which illustrates the module 452a for outputting the hourly forecast for Hagerstown, Md., then FIG. 5B, which illustrates a module 452b for outputting the hourly forecast module for Rockville, Md. Similarly, the graphical user interface 380 may display FIG. 6A, which illustrates module 452a for outputting the hourly forecast for Hagerstown, Md., then FIG. 6B, which illustrates a module 454a for outputting the current conditions for Hagerstown, Md. Other modules 450 may rotate to display, for example, multiple maps, multiple historical variables, etc., on the same portion of the screen over time.

The system 200 may be configured to enable users to customize the user-selected modules 450. For example, users may select user-specified weather conditions 328, user-specified locations 322, and/or user-specified time frames of interest to the user. Alternatively, the graphical user interface 380 may be configured to output weather conditions 328, locations 322, and/or modules 450 based on a user's role within an organization. The pre-determined weather conditions 328 and locations 322 may be set on a hierarchical scale. For example, the graphical user interface 380 available to a user responsible for a specific geographic area may only be enabled to monitor the locations 322 within that geographic area while the graphical user interface 380 available to a user is enabled to monitor the locations 322 within the larger region associated with the regional supervisor.

Figure 7:
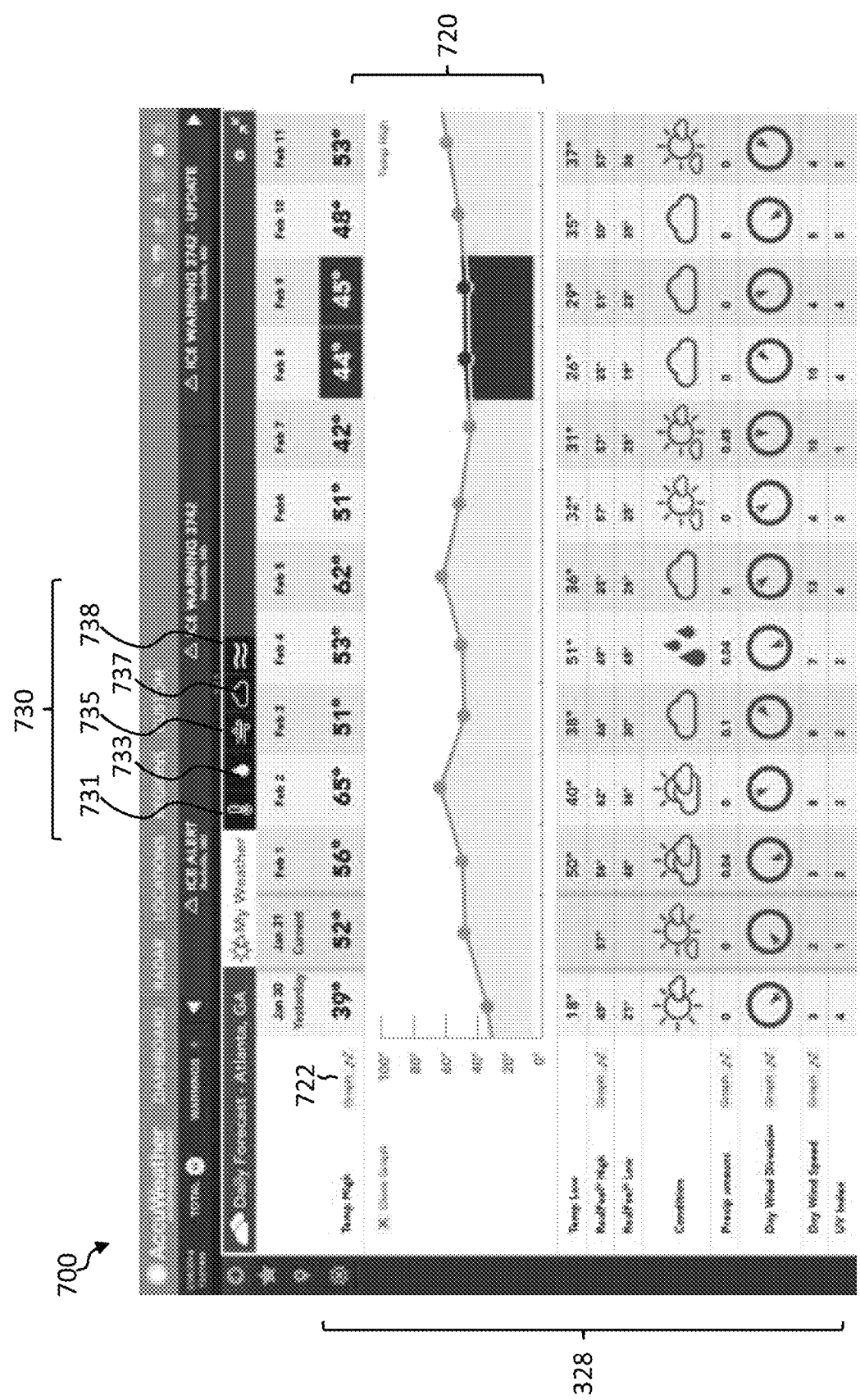
FIG. 7 illustrates additional modules which may be output by the graphical user interface according to exemplary embodiments of the present invention.

FIG. 7 illustrates a My Weather module 700 which may be available to users through the graphical user interface 380 according to exemplary embodiments of the present invention.

The My Weather module 700 enables the user to view current, historical forecasted weather conditions 328 for a location 322 in a grid-style frame. The weather conditions 328 included in the My Weather module may be selected by the user from the full set of weather conditions displayed on tabs 730 and may be arranged in rows. The user may control the order of the rows to reflect their role within their organization. Historical weather data for the one or more previous days may be presented. For example, the My Weather module 700 shown in FIG. 7 includes one day of historical weather data identified as "yesterday." Daily forecasts of each of the selected weather conditions 328 may be included in columns. The current weather data may be included in a single column and identified as "today" or "current." The weather conditions 328 may be grouped in sets available, for example, by selecting one or more tabs 730. The tabs 730 may include a temperature tab 731, a precipitation tab 733, a wind tab 735, a sky condition tab 727 and a marine tab 738.

One or more of the weather conditions 328 may also include a graph icon 722 to enable the user to graphically view the selected weather condition 328. In response to a user selection of a graph icon 722, the graphical user interface 380 may display a graphical representation 720 of the selected weather condition 328 for each of the days represented in the columns of the My Weather module 720. The graphical representation 720 may be a line graph (as illustrated in FIG. 7), a column or bar chart, an area chart, or any other graphical representation. The graphical representation 720 may display the selected weather condition 328 for each day aligned with the column that includes the weather conditions 328 for the corresponding day. As shown in FIG. 7, for example, the graphical representation 720 includes a line graph plotting the selected weather condition 328 (in this instance, the high temperature) including the historical high temperature for the previous day aligned with the column labeled "Yesterday", the current high temperature aligned with the column labeled "Current", and the forecasted high temperature for each remaining day aligned with each column of the corresponding day.

The system 200 may be configured to enable a user to customize each module 450, for example by selecting a module type (e.g., an hourly forecast module 452, a daily forecast module 456) or modifying the module (e.g., by selecting or changing the weather condition 328, the location 322, the temperature scale, etc). Some modules 450 may be customizable such that a user may specify the weather condition(s) 328, location(s) 322 and/or time frame(s). Other modules may specify the weather conditions and/or time frames. In those instances, the weather condition 328 and/or time frame is specified by the user based on the selection of the module 450. In other words, a user may specify a user-specified weather condition 328 by selecting a module 450 configured to output the weather condition 328.

Figure 8:
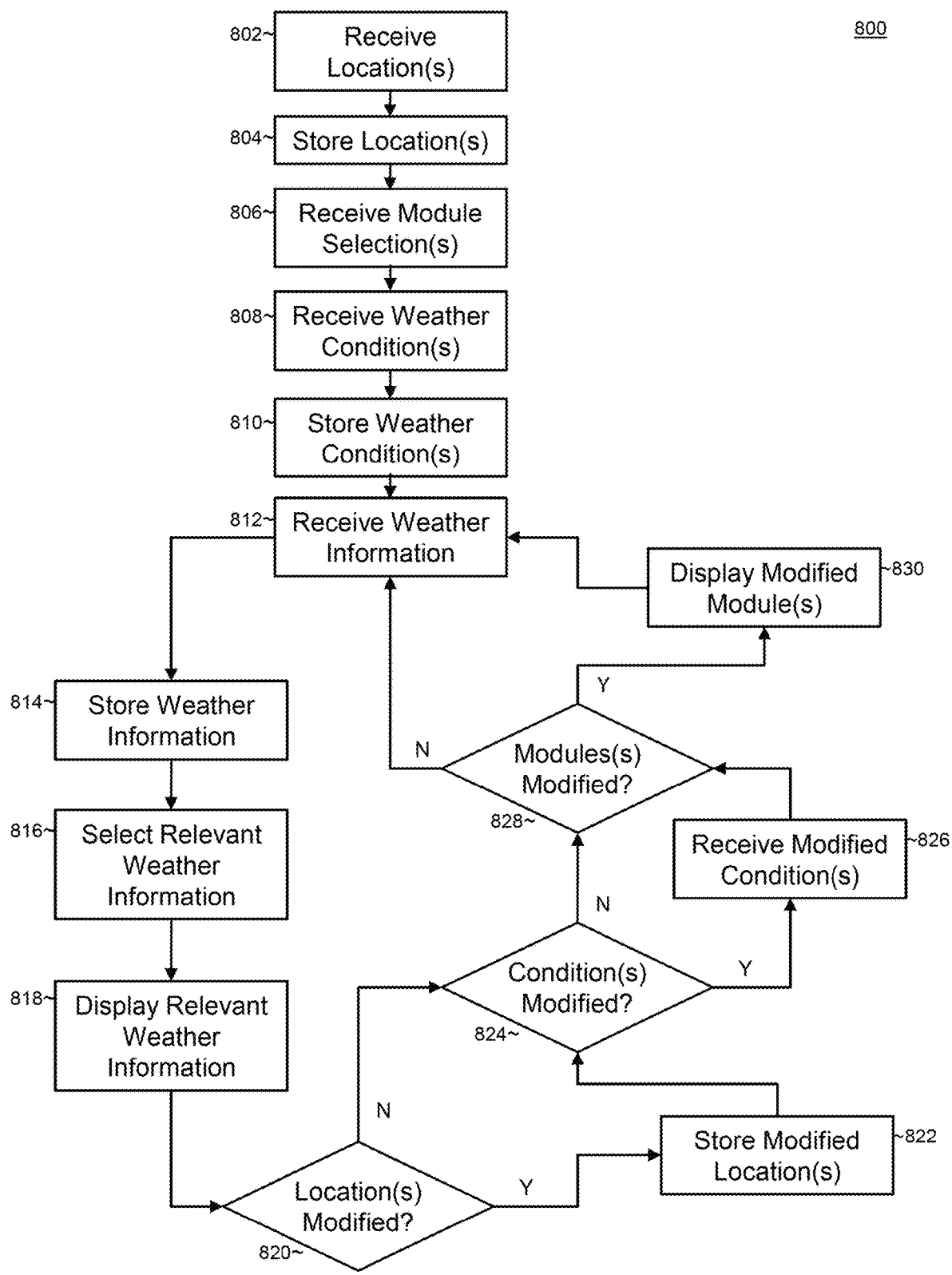
FIG. 8 is a flow chart of a process for outputting weather information to the graphical user interface according to an exemplary embodiment of the present invention.

FIG. 8 is a flow chart of a process 800 for outputting weather information to the graphical user interface 380 via the network 230 based on the user-specified weather conditions 328 and locations 322 according to an exemplary embodiment of the present invention. The process 800 may be performed, for example, by the analysis unit 360.

The locations 322 are specified by the user via the graphical user interface 380 in step 802 and stored in the user information database 320 in step 804. The modules 450 are selected by the user in step 806. The weather conditions 328 are specified by the user via the graphical user interface 380 in step 808 and are stored in the user information database in step 810. Weather information is received in step 812 and stored in the weather information database 340 in step 814. In step 816, the analysis unit 360 accesses the weather information database 340 and determines if the weather information is relevant to the user based on the user-specified locations 322 and the user-specified weather conditions 328. The relevant weather information is displayed by the graphical user interface 380 in step 818.

Because the system 200 is configured to enable a user to modify the user-specified location 322 via the graphical user interface 380, the analysis unit determines in step 820 whether the user has specified modified locations 322. If so, the analysis unit 360 stores the modified locations 322 in the user information database 320 in step 822. The system 200 is also configured to enable a user to modify the user-specified variables 328 via the graphical user interface 380. Accordingly, the analysis unit 360 determines in step 824 whether the user has specified modified locations 322. If so, the analysis unit 360 stores the modified variables 328 in the user information database 320 in step 826. The system 200 is also configured to enable a user to modify the user-selected modules 450. The analysis unit determines in step 828 if the user has modified the user-selected modules and, if so, outputs the modified user-selected modules via the graphical user interface 380 in step 830.

The process 800 returns to step 812 as updated weather information is received. Steps 812 through 830 are repeated automatically, continuously, and/or regularly such that updated weather information is selected based on the user-specified weather conditions 328 and user-specified locations 322 and displayed by the graphical user interface 380 via the user-selected module 450.

User-Specified Notifications

The system 200 may be configured to output notifications to users via the graphical user interface 380 based on the user-specified notification thresholds 332 stored in the user information database 320. The user-specified notification thresholds 332 may be multivariate expressions, including one or more of the weather conditions 328 described above, one or more of the client-specified locations 322, one or more time periods, etc. The one or more time periods may include common usage times such as "yesterday", "weekend", "next holiday", etc. Alternatively, the one or more time periods may include user-specified time periods in the past (e.g., over the last 24 hours), and/or user-specified future time (e.g., in the next 3 hours). The expressions may include mathematical expressions (such as greater than, less than, equal to, greater than or equal to, less than or equal to, etc., logical connectives, such as AND, OR, NOT, etc.)

Figure 9C:
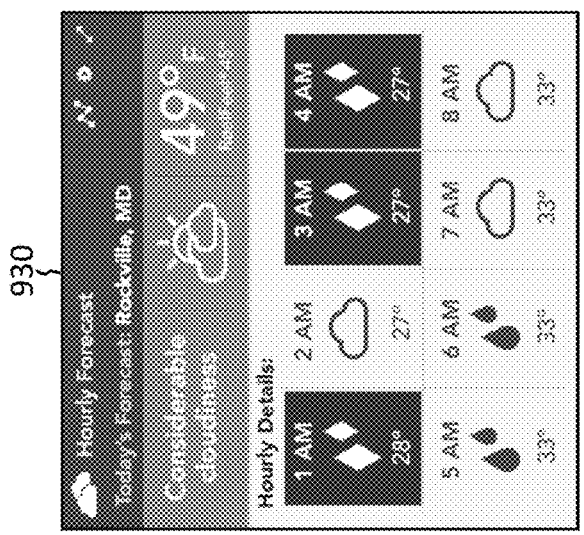
FIGS. 9A through 9C illustrate notifications output by the graphical user interface according to an exemplary embodiment of the present invention.
Figure 9B:
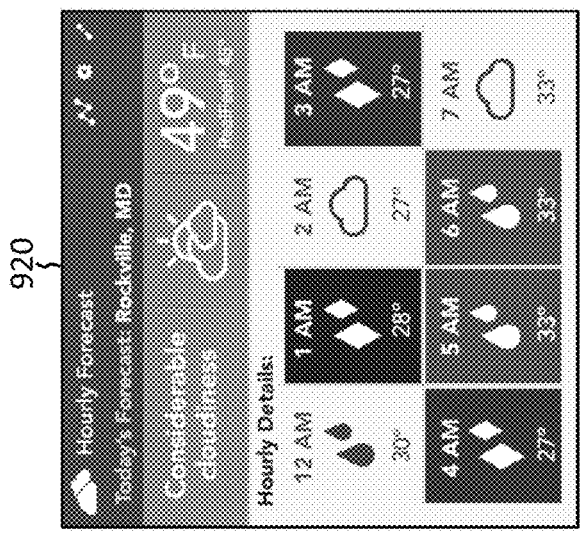
Figure 9A:
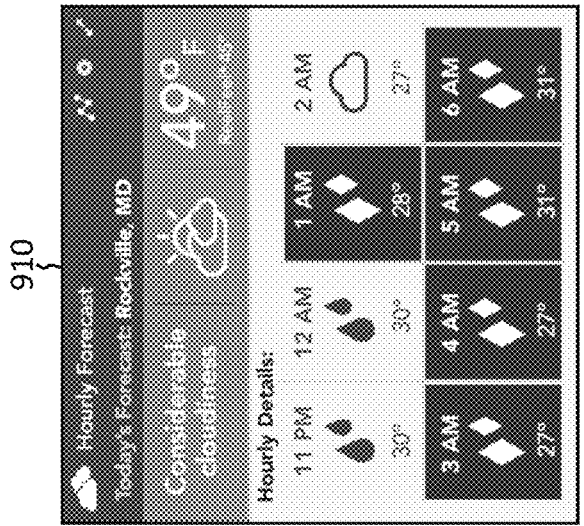

FIGS. 9A through 9C show notifications output by the graphical user interface according to an exemplary embodiment of the present invention, including three hourly forecast modules: module 910 output by the graphical user interface 380 at 11 pm (FIG. 9A), module 920 output by the graphical user interface 380 at 12 am (FIG. 9B), and module 930 output by the graphical user interface 380 at 1 am (FIG. 9C). In these examples, the notification thresholds 332 include a notification when the hourly forecast predicts ice. Accordingly, the forecasts for 1 am, and 3-5 am may include a notification. For example, the hourly forecasts for those time periods may be colored red.

Notifications may have tiered levels of severity. In one example, a purple colored notification may be more severe than a red colored notification and a green colored notification may indicate a reduction in severity. The system 200 may compare forecast data to previous forecast data and output a notification based on a change from the previous forecast. For example, the module 920 output at 12 am forecasts rain for 5 am and 6 am. The module 910 indicates that the previous forecast at 11 pm forecasts ice for 5 am and 6 am. Accordingly, the graphical user interface 380 may output a notification indicating a reduction in severity. For example, the hourly forecasts for those time periods in the module 920 may be colored green.

Alternatively, if a forecast for a time period increases in severity from a previously-issued time period (for example, from rain to ice or from 30 degrees F. to 25 degrees F.), the graphical user interface 380 may output a notification indicating an increase in severity. For example, the module 920 output at 12 am forecasts ice for 1 am. The module 910 indicates that the previous forecast at 11 pm forecasts ice for 1 am. However, the forecasted amount of ice for 1 am may be larger in the 12 am forecast in module 920 than the 11 pm forecast in module 910. Accordingly, the graphical user interface 380 may output a notification indicating an increase in severity. For example, the hourly forecasts for 1 am in module 920 time period in the module 920 may be colored purple.

Figure 10:
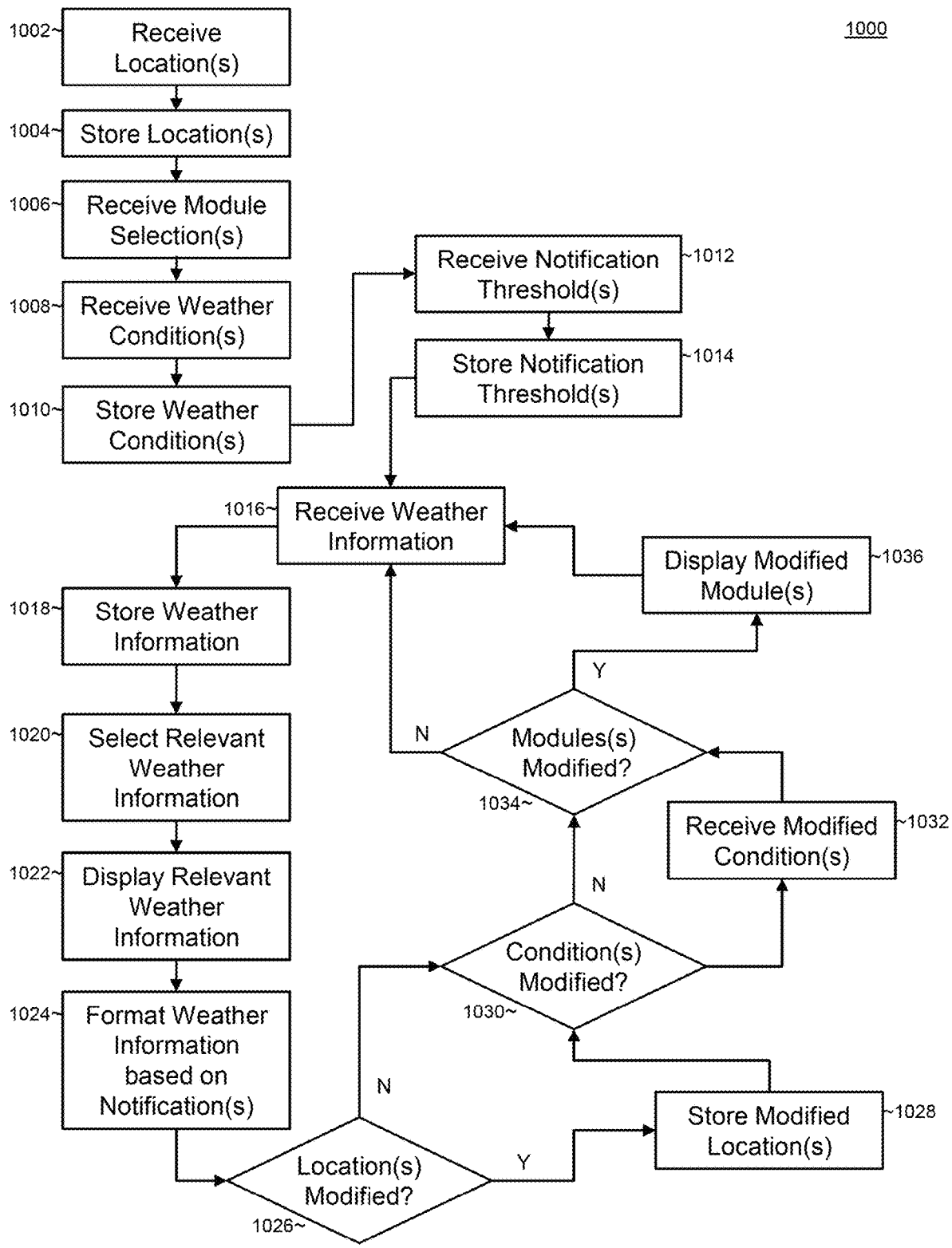
FIG. 10 is a flow chart of a process for outputting weather information to the graphical user interface according to an exemplary embodiment of the present invention.

FIG. 10 is a flow chart of a process 1000 for outputting notifications to the graphical user interface 380 according to an exemplary embodiment of the present invention. The process 1000 may be performed, for example, by the analysis unit 360.

The locations 322 are specified by the user via the graphical user interface 380 in step 1002 and stored in the user information database 320 in step 1004. The modules 450 are selected by the user in step 1006. The user-specified weather conditions 328 are specified by the user via the graphical user interface 380 in step 1008 and are stored in the user information database in step 1010. The notification thresholds 332 are specified by the user via the graphical user interface 380 in step 1012 and are stored in the user information database in step 1014. (Alternatively, the system 200 may include pre-stored notification thresholds). Weather information is received in step 1016 and stored in the weather information database 340 in step 1018. In step 1020, the analysis unit 360 accesses the weather information database 340 and determines if the weather information is relevant to the user based on the user-specified locations 322 and the user-specified weather conditions 328. The relevant weather information is displayed by the graphical user interface 380 in step 1022. The analysis unit 360 outputs a notification in step 1024 by formatting the weather information displayed on the graphical user interface 380 based on the user-specified notification thresholds 332.

Because the system 200 is configured to enable a user to modify the user-specified location 322 via the graphical user interface 380, the analysis unit determines in step 1026 whether the user has specified modified locations 322. If so, the analysis unit 360 stores the modified locations 322 in the user information database 320 in step 1028. The system 200 is also configured to enable a user to modify the user-specified variables 328 via the graphical user interface 380. Accordingly, the analysis unit 360 determines in step 1030 whether the user has specified modified variables 328. If so, the analysis unit 360 stores the modified variables 328 in the user information database 320 in step 1032. The system 200 is also configured to enable a user to modify the user-selected modules 450. The analysis unit determines in step 1034 if the user has modified the user-selected modules 450 and, if so, outputs the modified user-selected modules 450 via the graphical user interface 380 in step 1036.

The process 1000 returns to step 1016 as updated weather information is received. Steps 1016 through 1036 are repeated automatically, continuously, and/or regularly such that updated weather information is selected based on the user-specified weather conditions 328 and user-specified locations 322 and displayed by the graphical user interface 380 via the user-selected module 450 formatted based on a notification, which is based on user-defined notification thresholds 332.

The user specified notification thresholds 332 may include query language (e.g., SELECT, FROM, WHERE, etc.) mathematical operators (e.g., greater than, less than, equal to, greater than or equal to, less than or equal to, etc.), logical connectives (e.g., AND, OR, NOT, etc.), etc. The user specified notification thresholds 332 may include the current, historical and forecast weather data and weather-related warnings stored in the weather information database 340, the acknowledgements 336 and the user-specified locations 322, weather conditions 328, notification thresholds 332, and procedures 326 stored in the user information database 320. A notification threshold 332 may be specified to notify an individual regarding desirable conditions, such as conditions conducive to laying paving or pouring concrete. For example, that notification threshold 332 may be set to output a notification when 3 or more days of warm, dry days are expected. Alternatively, a notification threshold 332 may be specified to notify an individual regarding undesirable conditions, such as an expression set to notify a user regarding below freezing temperatures which may result in damage to vegetation left in the elements outside of a greenhouse or protected environment. The system 200 may be configured to utilize one or more predictive algorithms to output alerts for locations based on weather conditions 328 at other locations, to output alerts for one time period based on weather conditions 328 and/or predicted weather conditions 328 for other time periods, and to output alerts regarding one weather condition 328 based on other weather conditions 328. The system 200 may be configured to utilize one or more predictive algorithms to output alerts for locations based on weather conditions 328 at other locations, to output alerts for one time period based on weather conditions 328 and/or predicted weather conditions 328 for other time periods, and to output alerts regarding one weather condition 328 based on other weather conditions 328.

In another example, a user who regularly decides whether he/she will commute to work by bicycle or train may input user-specified notification thresholds 332 such that the system 200 outputs a notification to his/her when the weather is conducive to ride a bike to work. Accordingly, he/she may specify a notification threshold 332 such that the system 200 outputs a notification to him/her each weekday at 7 am if the current temperature and the predicted temperature for 5 pm is between a minimum and a maximum temperature, the current and predicted humidity for 5 pm is less than a maximum value, and the probability of precipitation from 7-8 am and from 5-6 pm is less than a maximum probability. The system may store his/her user-specified notification threshold 332 in the user information database 320 and the analysis unit 360 may output a notification if the current and forecasted weather conditions 328 stored in the weather information database 340 satisfy his/her user-specified notification threshold 332.

The system 200 may be configured to utilize one or more predictive algorithms to output notifications for locations based on weather conditions 328 at other locations, to output notifications for one time period based on weather conditions 328 and/or predicted weather conditions 328 for other time periods, and to output notifications regarding one weather condition 328 based on other weather conditions 328. For example, the weather information database 340 may include information regarding a thunderstorm at a first location moving in one direction and a cold front at a second location moving in another direction. Based on that information, the analysis unit, executing a predictive algorithm, may output a notification for freezing conditions on bridges at the location and time that the thunderstorm and cold front are predicted to intersect.

Notifications may be output to users via color or other visual indication in the formatting of the hourly, daily, forecast, and historical data included in the modules 450. Additionally, the system 200 may be configured to output notifications in textual format via a messaging application included in the graphical user interface 380 or by any other method such as email, text message, smart phone widget or notification, automated or personal telephone call, etc. Additionally, the system 200 may be configured to output audible notifications. For example, the analysis unit 360 may output a notification to a remote computer system 240 that is configured to output a sound indicating that a notification has been received and/or convert a textual notification to an audible notification using text-to-speech functionality and output the audible notification based on the converted textual notification.

The system enables users to set and/or receive notifications specific to the user's role within an organization (e.g., a notification for below-freezing temperatures for the department manager who needs to ensure vegetation is brought in doors or a notification for the advertising director who would like to display advertising relevant to ideal conditions for buying and laying fertilizer in the coming week, etc.) The system 200 may be configured to enable users to send notifications and user-specified notification thresholds 332 with other users of the system 200 via the graphical user interface 380. The system may also be configured to enable users (for example, client administrators) to send notifications to all individuals included in client-specified workgroups.

Figure 11:
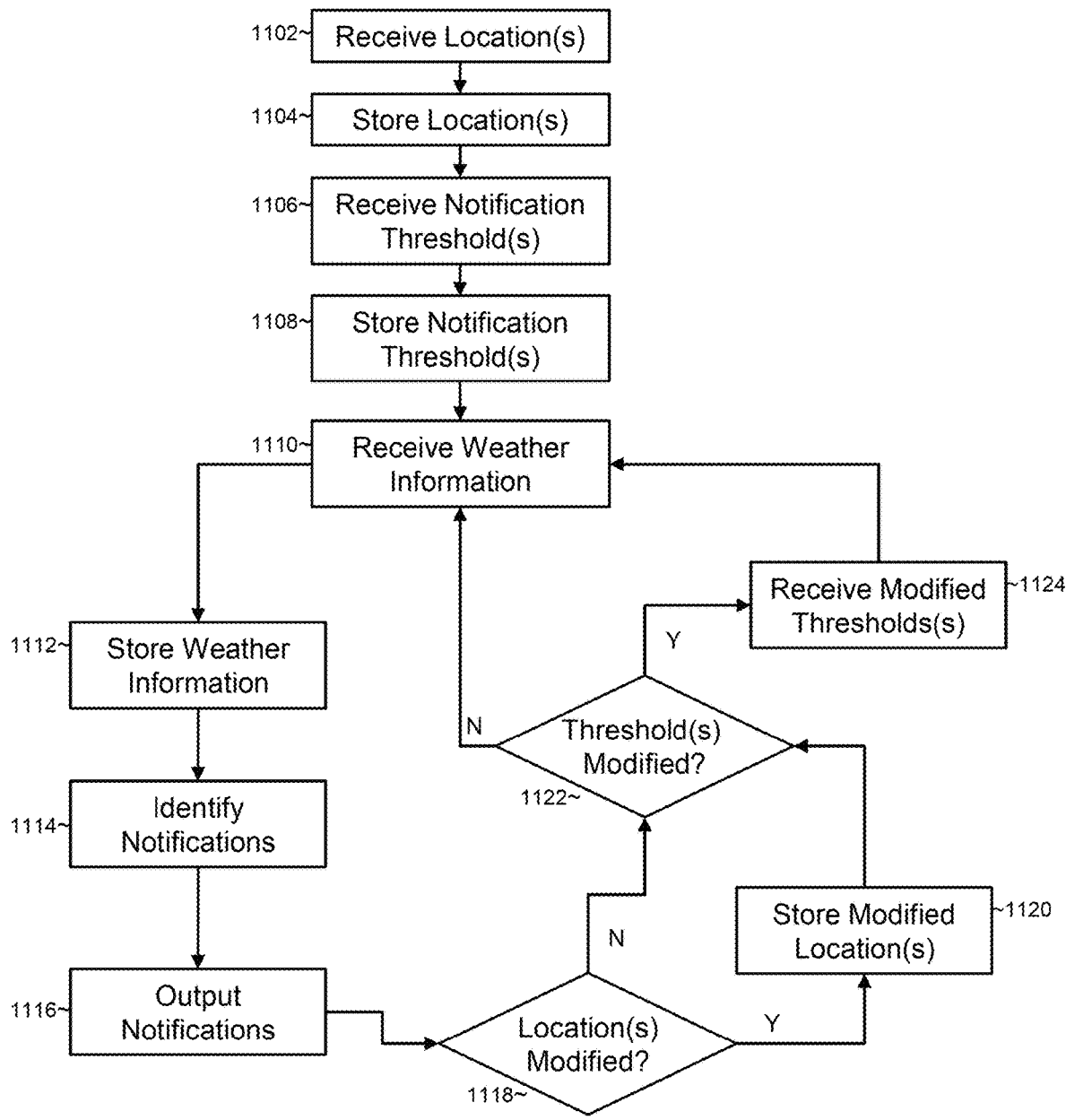
FIG. 11 is a flow chart of a process for outputting notifications to the graphical user interface according to another exemplary embodiment of the present invention.

FIG. 11 is a flow chart of a process 1100 for outputting notifications to the graphical user interface according to another exemplary embodiment of the present invention. The process 1100 may be performed, for example, by the analysis unit 360.

The locations 322 are specified by the user via the graphical user interface 380 in step 1102 and stored in the user information database 320 in step 1104. The notification thresholds 332 are specified by the user via the graphical user interface 380 in step 1106 and are stored in the user information database in step 1108. Weather information is received in step 1110 and stored in the weather information database 340 in step 1112. In step 1114, the analysis unit 360 accesses the weather information database 340 and determines if the notification must be issued based on the user-specified notification thresholds 332. The notification is output by the analysis unit 360 in step 1116.

Because the system 200 is configured to enable a user to modify a user-specified location 322 via the graphical user interface 380, the analysis unit determines in step 1118 whether the user has specified modified locations 322. If so, the analysis unit 360 stores the modified locations 322 in the user information database 320 in step 1120. The system 200 is also configured to enable a user to modify a user-specified notification threshold 1112 via the graphical user interface 380. Accordingly, the analysis unit 360 determines in step 1122 whether the user has specified modified notification thresholds 332. If so, the analysis unit 360 stores the modified notification thresholds 332 in the user information database 320 in step 1124.

The process 1100 returns to step 1110 as updated weather information is received. Steps 1110 through 1124 are repeated automatically, continuously, and/or regularly such that updated weather information is selected based on the user-specified weather conditions 328 and user-specified locations 322 and displayed by the graphical user interface 380 via the user-selected module 450.

Figure 12:
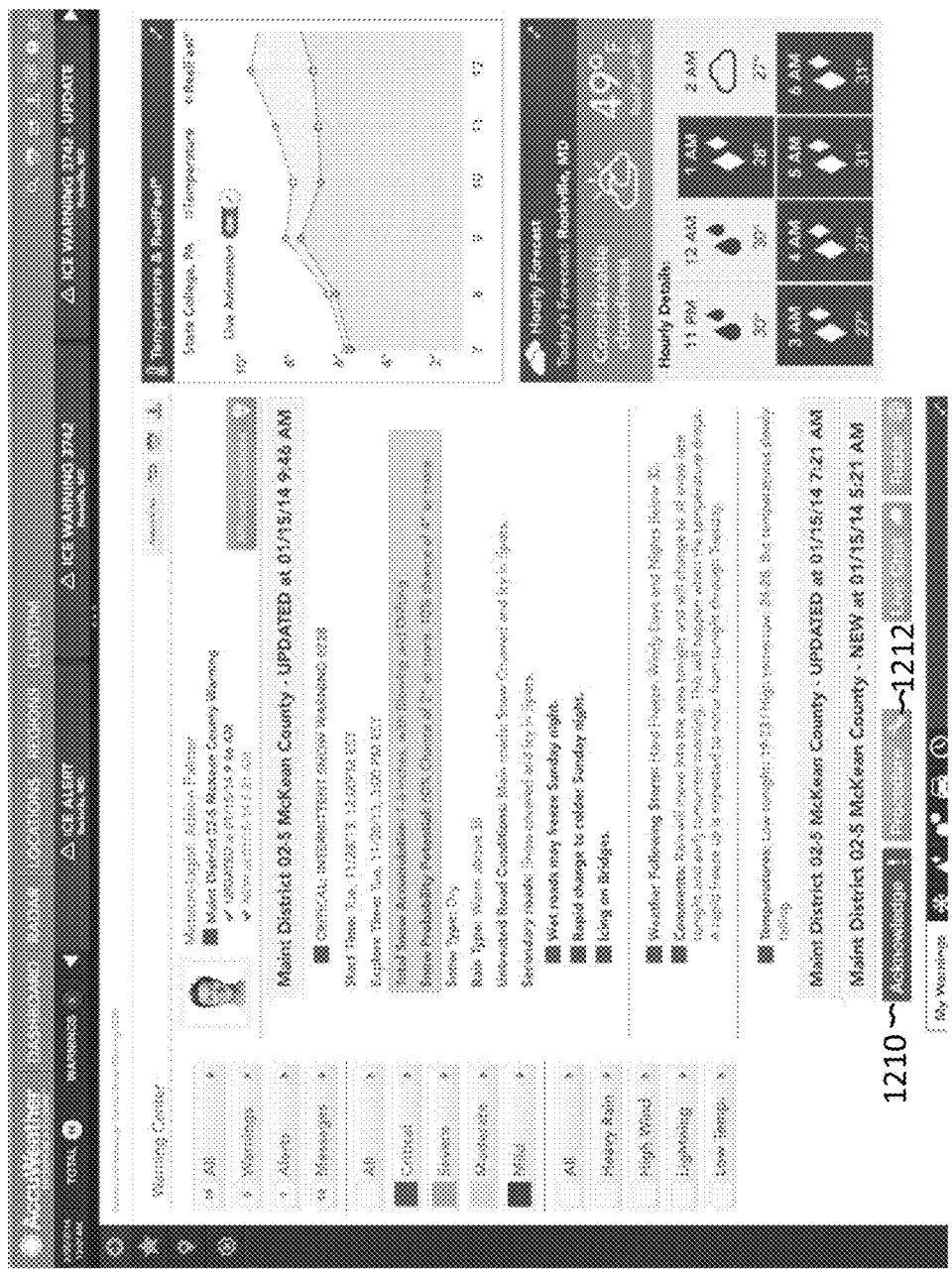
FIG. 12 illustrates a notification view of the graphical user interface according to an exemplary embodiment of the present invention.

FIG. 12 illustrates a textual notification view 1200 of the graphical user interface 380 according to an exemplary embodiment of the present invention. Notifications may be output based on a determination that a weather-related warning has been issued in a user-specified location 322. Alternatively, notifications may be output based on a determination that a user-specified weather condition 328 is greater than or equal to the weather-related notification threshold 322 in the user-specified location 322 or based on a determination that a specified weather condition 328 is less than or equal to the weather-related threshold 332 in the user-specified location 322. The notifications may also indicate what notification threshold 332 has been met or what weather-related warning has been output and may include user-supplied information about the textual notification.

The system 200 may also be configured to output notifications in the form of a module 450 via the dashboard view 400 of the graphical user interface 380. Referring back to FIG. 4C, for example, the notification module 480 illustrates a notification based on a user-specified notification threshold 332 (in that example, indicating whether winds in the next 45 days are forecasted to exceed 50 miles per hour).

User-Specified Procedures

The system 200 may be configured to provide user-specific procedures in response to textual notifications, system notifications (e.g., a new image in a hurricane impact forecast, an update to a meteorologist's blog, etc.), updates to the system 200, status notifications (e.g., an issue with lightning detection network, etc.), and any additional notification types that may be created in the future.

Referring back to FIG. 12, textual notification view 1200 includes a procedure link 1212 to enable users to view user-specified procedures 326 associated with the issued warning. Textual notifications output by the graphical user interface 380 may also include the user-specified procedures 326 or a link similar to the procedure link 1212 to enable users to view the user-specified procedures 326. The textual notifications and/or the procedures 326 may also be output via the graphical user interface as part of a module. Referring back to FIG. 4C, for example, the procedure module 490 illustrates a module configured to identify a user-specified procedure 326 (in that example, "Procedure 9") in response to a user-specified notification threshold 332 (in that example, if the temperature is forecasted to exceed 86 degrees and the humidity is forecasted to exceed 60%). Referring to FIG. 7, the procedure module 790 illustrates a module configured to output a user-specified notification (in that example, "Bridge icing probable") and a user-specified procedure 326 (in that example, "Procedure 9") in response to a user-specified notification threshold 332 (in that example, if the forecasted temperature is below 32 degrees and the wind speed is forecasted to exceed 20 miles per hour. The user-specified procedures 326 may also be output by graphical user interface 380 by a textual presentation (such as the textual notification view 1200), or by any other method such as email, text message, smart phone widget or notification, automated or personal telephone call, etc. The textual notifications and/or the procedures 326 may include text, graphics, maps, animation, audio, a link to receive audio, video, a link to receive video, etc.

The procedures 326 may be specific to a type of weather event (e.g., a procedure for an impending tornado may differ from the procedure for an anticipated heat wave), a warning issued, a condition expected to or having occurred, thresholds met, a facility location (e.g., a procedure for a weather event at a first location of an organization may vary from a procedure for the same weather event at second location of the organization), a user role (e.g., the procedures 326 output to the facilities director of a school district may differ from the procedures 326 supplied to the high school principal), etc. The system 200 enables users (for example, client administrators) to identify the user-specific procedure associated with each type of weather event, warning, facility location, user role, etc.

By including client-specific procedures 326 or a link to the client-specific procedures 326 with weather-related warnings or notifications, the system 200 eliminates the need for users to search for established company procedures during an emergency and, instead, provides users with instant access to expected procedures 326 as defined by the user organization.

Acknowledgement of Notifications

The system 200 may be configured to receive and store acknowledgements 336 received by the system 200 from users acknowledging the receipt of textual notifications, system notifications (e.g., a new image in a hurricane impact forecast, an update to a meteorologist's blog, etc.), updates to the system 200, status notifications (e.g., an issue with lightning detection network, etc.), and any additional notification types that may be created in the future.

Notifications provide a method for the user to acknowledge receipt of the notification to AccuWeather. As shown in the textual notification view 1200 of FIG. 12, for example, the weather-related warning includes acknowledgement link 1210 to enable authorized personnel 324 view acknowledge the warning. If the notification does not receive a response, AccuWeather meteorologists may invoke other contact methods based upon notification type, criteria, and client policy for ensuring the user/client has received the notification.

Acknowledgment functionality may be made available only to individual personnel 324 identified by the user as being authorized to make this acknowledgement on behalf of the unit or company as a whole. Authorization may be on a hierarchical scale. For example, a user responsible for a specific geographic area may only be enabled to acknowledge notifications for the locations 322 within that geographic area while that user's regional supervisor may be enabled to acknowledge notifications for the locations 322 within the larger region.

Identifications of authorized personnel 324 may be stored in the user information database 320. For example, the user information database 320 may include a user profile for each of the personnel 324. The user profile may indicate whether a user is authorized to make this acknowledgement on behalf of the unit or company as a whole. The system 200 may be configured to allow administrators and supervisory users to view acknowledgements 336 and identify which personnel 324 has acknowledged or failed to acknowledge a notification. Accordingly, the system 200 enables administrators and supervisory users to identify hazards or missed opportunities by monitoring what has and has not been acknowledged.

The acknowledgments 336 may be stored, for example, in the user information database 320 and archived to allow for retrieval of information of the notification and confirmation of if and when and by whom a notification was acknowledged. The graphical user interface 380 may contain visual cues as to whether notifications have been acknowledged or not. For example, a warning may have an icon or be colored red to indicate it has not been acknowledged. These visual cues will change once the message has been acknowledged.

User-Defined Queries

The system 200 may be configured to enable users to create user-defined queries 334. The queries 334 may include one or more query parameters which may be defined by one or more users, for example, by inputting the query parameters into one of the remote computer systems 240 via the graphical user interface 380. The queries 334 may be stored, for example, in the user information database 320 associated with the user and executed by the analysis unit 360. Alternately, queries 334 may be input on an ad-hoc basis by the user, in which case, the query 334 is stored either on user information database 320 or on the user's computer 250 and/or 260. The query 334 may be executed in response to user input (for example, via the graphical user interface 380) or in response to computer-readable instructions. Results of the queries 334 may be output by the analysis unit 360 to one or more remote computer systems 240 for display on the graphical user interface 380 or stored, for example, in the user information database 320. The query results may also be output by the analysis unit 360 to the server 210 or any another device, for example, via the network 230.

The query parameters may include query language (e.g., SELECT, FROM, WHERE, etc.) mathematical operators (e.g., greater than, less than, equal to, greater than or equal to, less than or equal to, etc.), logical connectives (e.g., AND, OR, NOT, etc.), etc. The query parameters may include the current, historical and forecast weather data and weather-related warnings stored in the weather information database 340, the acknowledgements 336 and the user-specified locations 322, weather conditions 328, notification thresholds 332, and procedures 326 stored in the user information database 320. Additionally, the query parameters may contain user-supplied data or information, including but not limited to the locations relevant to the user, the role of the user viewing the output, and access limitations based on the credentials and privileges granted to the user.

A query 334 may be used, for example, to perform geospatial analysis of the proximity of the locations 322 stored in the user information database 320 to the locations of the current, historical, and forecasted weather and weather-related warnings stored in the weather information database 340. The query 334 may be defined to perform the geospatial analysis on all of the locations 322 or all locations 322 satisfying user-selected criteria associated with the locations 322. For example, a user selects a facility type (e.g., stores, cell towers, etc.) if the facility type information is associated with the locations 322. The query 334 may be defined to perform the geospatial analysis regarding any of the weather conditions stored in the weather information database 340. For example, a user may select current conditions, lightning, storm reports, forecast data, earthquakes, wildfires, etc. The query 334 may be defined to include a condition statement. For example, the user may select a value threshold, magnitude, distance from a phenomenon, timing, etc. The query 334 is executed by the analysis unit 360 to determine which locations 322 meet the query parameters. The query 334 may initiate downstream query actions based on the satisfaction of certain condition statements.

The query results may be output, for example, as a table with columns of information regarding the locations 322 that satisfy the query 334 and/or the weather impact on the locations 322. The system 200 may be configured such that users may then select a given record in the table to view either a map overlay or more details about the weather impact on the locations 322. The query 334 results may appear as a "dashboard"-type module that presents the results with dynamically updating data in real time or near real time. Referring back to FIG. 4B, for example, the results of a user-specified query may be output by the graphical user interface as a module similar to the query module 470. In the example illustrated in FIG. 4B, the query module 470 illustrates the results of four user-defined queries. First, the number of user-specified locations 322 (e.g., stores) that received over 5 inches of snow yesterday (in that example, 69), the number of user-specified locations 322 in which ice is forecasted (in that example, 103), the number of user-specified locations 322 that received over 1.5 inches of rain yesterday (in that example, 5), and the number of user-specified locations 322 in which wind over 55 miles per hour is forecasted (in that example, 25).

Figure 13:
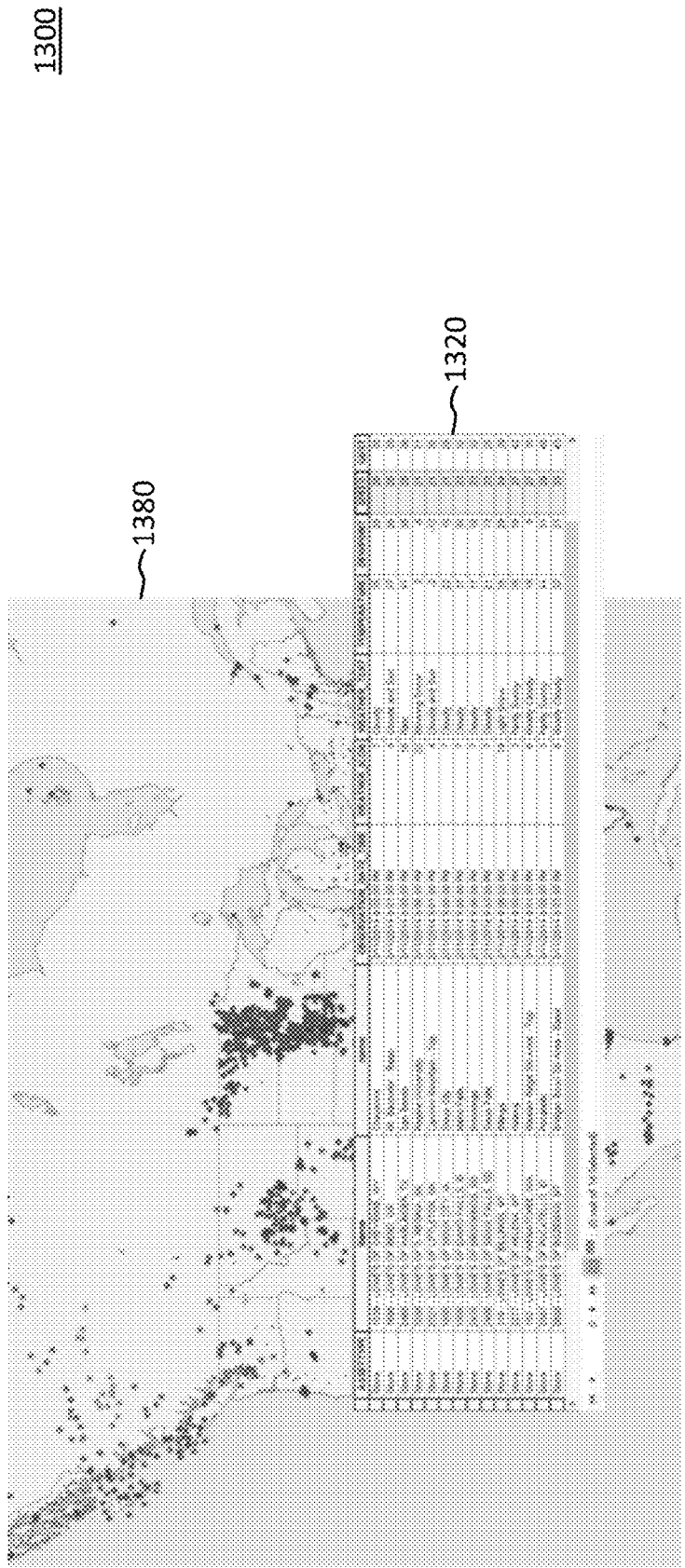
FIG. 13 illustrates a query according to an exemplary embodiment of the present invention.

FIG. 13 illustrates an example query 1300 to determine locations 322 identified as "stores" that are within 5 miles of a current wind observation exceeding 20 miles per hour. In the exemplary embodiment illustrated in FIG. 13, the query results are output as a table 1320 and a map overlay 1380.

In one example, the analysis unit 360 may repeat the query 334 automatically, continuously, repeatedly, and/or regularly (for example, at pre-determined or user-specified time intervals) as the weather information database 340 is updated. The query 334 may contain multiple weather conditions 328, multiple locations 322, and varying time periods such as hourly, daily, weekly, seasonally, and/or annually. In this example, the analysis unit 334 may visualize the query results by dynamically updating the information output by the graphical user interface 380. When executing a query 334, the analysis unit 360 may read the data (for example, user data or weather-related data) identified by query parameters (which may be stored, for example, in the user information database 320 and/or the weather information database 340), temporarily store the data (for example, in random access memory) if required, and determine the query result (or results) by identifying portions of the data that satisfy the query parameters.

The system 200 may enable a user to identify one or more downstream query actions to be performed in response to the query 334. Downstream query actions may include, for example, automatically initiated business decisions such as outputting messages to individuals at locations that satisfy the query. The messages and/or business decisions may be related to sales, marketing, advertising, transportation, safety, etc. After outputting and/or storing the results of a query 334 with associated downstream query actions, the analysis unit 360 may simultaneously or near-simultaneously initiate the associated downstream query functions. The system 200 may also enable a user to select multiple queries 334 and the multiple queries 334 may be executed simultaneously or near-simultaneously by the analysis unit 360. The system 200 may also be configured to enable a user to view and modify queries 334 associated with the user through the graphical user interface 380.

The analysis unit 360 may analyze relevant weather data and weather-related warning data from the weather information database 340 in relation to the queries 334. Based on the condition statements in the query 334, the analysis unit 360 may utilize traditional statistical methods to output weather-based guidance to the user and perform any downstream query actions specified by the user. Based on condition statements, the query 334 may also statistically relate past weather with past variables to project future weather and other weather conditions 328 to predetermine downstream query actions. Moreover, based on condition statements, the query may statistically relate past weather with past weather conditions and project future weather and recommendations for future business decisions using any and/or all known statistical and quantitative methods for making such a determination, including multivariate analysis.

As required by the query 334, the analysis unit 360 may also utilize weather assessment functions such as current weather conditions, past, present and future lightning strikes, storm reports, tropical weather reports and forecasts, general forecast data, earthquake alerts and warnings, and wildfire alerts and warnings. These functions may be pre-installed on the graphical user interface 380 and/or the analysis unit 360. Once the analysis unit 360 identifies the query results that satisfy the query parameters, the query results may be output by the analysis unit 360 to the graphical user interface 380.

Query results may appear as graphical representations, numerical representations, tables, charts, or in any other representation useful to a user as self-contained rotating content windows or modules within the dashboard view 400 or visual representations within the map view 100 of FIG. 1. Query results may appear on any computer system 250 and/or 260 that supports a web browser and the internet. Query results may be displayed in any Geographic Information System compatible format on a map designed by the inventors or any other third party. Queries 334 may display results with or without weather and/or maps to provide simplified visualization of the query results.

A query 334 may be executed by a user through the graphical user interface 380. When a user selects a query to run, the user information database sends the query 334 to the analysis unit 360. The analysis unit 360 receives the data, stores it, and determines the data required to complete the query 334 and accesses that data from the weather information database 340. The analysis unit 360 analyzes the relevant data from the weather information database 340 in relation to the query 334. Once the analysis unit 360 completes the analysis of the query 334, the query result is sent from the analysis unit 360 to the graphical user interface 380. The user preferably visualizes that requested data through dynamic updates on the graphical user 380. Multiple queries 334 may be executed at one time by a user, and the results of those queries 334 may appear as self-contained rotating content windows or modules within the map view 100 of the graphical user interface 380. If downstream query actions have been set by the user, the graphical user interface 380 will initiate them concurrently with the display of the query results. A query 334 may also run continuously in a rotating content module within the graphical user interface 380. Such a query 334 may continuously update its results in real-time based on a continuous flow of data. The user may change any query parameters in a query 334 at any time, and the query results will dynamically update on the graphical user interface 380 through the above-described process.

Null Warnings

The system 200 may be configured to output a null warning. For example, the National Weather Service may issue a winter storm warning for a geographic area. If an organization using the system 200 has a user-specified location 322 in the geographic area, they may receive a notification based on the NWS-issued public winter storm warning. The weather information database 340, however, may include more specific information which the system 200 may use to determine that the user-specific location 322 is unlikely to be affected by the winter storm. For example, the system 200 may determine that the weather information regarding the user-specific location does not meet a predefined risk trigger.

Accordingly, the analysis unit 360 may determine, based on the weather data in the weather information database 340, that a severe condition is unlikely to impact the user-specified location 322 and output a null warning in response to a determination that the severe condition is unlikely to impact the user-specified location 322. The null warning may be output via the graphical user interface or via email, text message, smartphone widget, smartphone notification, or telephone message, etc.

The null warning may include an acknowledgment link as described above. Acknowledgment functionality may be made available only to individual personnel 324 identified by the user as being authorized to make this acknowledgement on behalf of the unit or company as a whole. Authorization may be on a hierarchical scale. For example, a user responsible for a specific geographic area may only be enabled to acknowledge null warnings for the locations 322 within that geographic area while that user's regional supervisor may be enabled to acknowledge null warnings for the locations 322 within the larger region. Identifications of authorized personnel 324 may be stored in the user information database 320.

The system 200 is configured to allow administrators and supervisory users to view null warnings and identify which personnel 324 has acknowledged or failed to knowledge a null warning. For example, department heads within an organization or on-site personnel at multiple locations.

Accordingly, the system 200 enables administrators and supervisory users to identify hazards or missed opportunities by monitor what has and has not been acknowledged.

While preferred embodiments have been set forth above, those skilled in the art who have reviewed the present disclosure will readily appreciate that other embodiments can be realized within the scope of the invention. For example, disclosures of specific numbers of hardware components, software modules and the like are illustrative rather than limiting. Therefore, the present invention should be construed as limited only by the appended claims.

What is claimed is:

1. A system, comprising:
a weather information database, stored on non-transitory computer readable storage media, configured to store weather data associated with a plurality of geographic locations including a plurality of weather-related warnings associated with the plurality of geographic locations received from a third party;
a graphical user interface configured to receive a user-specified location, a user-specified procedure, and a user-specified weather inquiry from a user, the user-specified weather inquiry comprising a weather-related warning of the plurality of weather-related warnings, and the user specified procedure comprising an instruction that the user performs in response to the weather related warning;
a user information database, stored on the non-transitory computer readable storage media, configured to store the user-specified location, the user-specified procedure, and the user-specified weather inquiry received from the user via the graphical user interface; and
a remote server that includes an analysis unit configured to:
determine if the weather data: includes the weather-related warning specified by the user specified weather inquiry in the user specific location; and
output the user-specified procedure to the user in response to the determination that the weather data (i) includes the weather-related warning specified by the user-specified weather inquiry and (ii) includes a change in severity of the weather data based on comparing forecast data for the weather data to previous forecast data for the weather data.

2. A method, comprising:
receiving, at a remote server, weather data associated with a plurality of geographic locations, the weather data including a plurality of weather-related warnings associated with the plurality of geographic locations received from a third party;
receiving, at the remote server, a user-specified location, a user-specified procedure, and a user-specified weather inquiry from a user via a graphical user interface, the user-specified weather inquiry comprising a weather-related warning of the plurality of weather-related warnings, and the user-specified procedure comprising instruction that the user performs in response to the weather-related warning;
storing, at the remote server, the user-specified location, the user-specified procedure, and the user-specified weather inquiry received from the user via the graphical user interface;
determining if the weather data: (i) includes the weather-related warning specified by the user specified weather inquiry in the user specific location; and
outputting, from the remote server, the user-specified procedure to the user in response to the determination that the weather data: (i) includes the weather-related warning specified by the user-specified weather inquiry and (ii) includes a change in severity of the weather data based on comparing forecast data for the weather data to previous forecast data for the weather data.

3. The method of claim 2, wherein the plurality of weather-related warnings include river flood warnings, thunderstorm watch boxes, tornado watch boxes, mesoscale discussions, polygon warnings, zone/country warnings, outlooks, advisories, watches, special weather statements, lightning warnings, thunderstorm warnings, heavy rain warnings, high wind warnings, high or low temperature warnings, local storm reports, earthquakes, or hurricane impact forecasts.

4. The method of claim 2, further comprising:
receiving via a network a location of a mobile computer system, the location of the mobile computer system determined by a location detection unit configured to determine the location of the mobile computer system; and
determining the user-specified location based on the location of the mobile computer system.

5. The method of claim 2, further comprising:
repeatedly receiving updated weather data; and
automatically and repeatedly determining if the updated weather data includes the weather-related warning specified by the user-specified weather inquiry in the user-specified location.

6. The method of claim 2, further comprising:
outputting the user-specified procedure to the user via the graphical user interface.

7. The method of claim 2, further comprising:
outputting the user-specified procedure to the user via email, text message, smartphone widget, smartphone notification, or telephone message.

8. The method of claim 2, wherein outputting the user-specified procedure comprises:
outputting a notification that includes a procedure link; and
outputting the user-specified procedure in response to user selection of the procedure link.

9. The method of claim 2, further comprising:
storing a plurality of user-specified procedures, each of the user-specified procedures associated with one of a plurality of recipients, the plurality of recipients including the user; and
outputting the user-specified procedure associated with the user to the user in response to the determination that the weather data includes the weather-related warning specified by the user-specified weather inquiry in the user-specified location.

10. The method of claim 2, further comprising:
storing a plurality of user-specified procedures, each of the user-specified procedures associated with one of the plurality of weather-related warnings; and
outputting the user-specified procedure associated with the weather-related warning specified by the user-specified weather inquiry in response to the determination that the weather data includes the weather-related warning specified by the user-specified weather inquiry in the user-specified location.

11. The method of claim 2, further comprising:
storing a plurality of user-specified procedures, each of the user-specified procedures associated with a plurality of locations, the plurality of locations including the user-specified location; and outputting the user-specified procedure associated with the user-specified location in response to the determination that the weather data includes weather-related warning specified by the user-specified weather inquiry in the user-specified location.

12. The method of claim 2, further comprising:

storing a plurality of user-specified procedures, each of the user-specified procedures associated with a plurality of user roles, the plurality of user roles including a role associated with the user; and outputting the user-specified procedure associated with the role associated with the user in response to the determination that the weather data includes the weather-related warning specified by the user-specified weather inquiry in the user-specified location.

13. The method of claim 2, further comprising:

outputting an acknowledgement link to the user for the user to acknowledge receipt of the user-specified procedure;

receiving an acknowledgement of receipt of the user-specified procedure in response to user selection of the acknowledgement link; and storing the acknowledgement.

14. The method of claim 13, further comprising:

storing a plurality of user profiles associated with a plurality of users, the plurality of users including the user; and outputting an indication of whether or not the acknowledgement of receipt of the user-specified procedure was received from the user to another user via the graphical user interface.

15. The method of claim 2, further comprising:

storing a plurality of user profiles associated with a plurality of users, the plurality of users including the user;

determining if the user is authorized to acknowledge receipt of the user-specified procedure based on a user profile associated with the user;

outputting an acknowledgement link to the user for the user to acknowledge receipt of the user-specified procedure;

receiving an acknowledgement of receipt of the user-specified procedure in response to user selection of the acknowledgement link; and storing the acknowledgement.

16. The method of claim 15, further comprising:

outputting an indication of whether or not the acknowledgement of receipt of the user-specified procedure was received from the user to another user via the graphical user interface.

17. The method of claim 2, wherein the weather data comprises a weather-related warning indicative of a severe condition for a geographic area including the user-specified location and the user-specified weather inquiry further comprises an instruction to determine whether to output a null warning, the method further comprising:

determining, based on the weather data, whether the severe condition is unlikely to impact the user-specified location; and outputting a null warning in response to a determination that the severe condition is unlikely to impact the user-specified location.

18. The method of claim 17, further comprising:

outputting the null warning via the graphical user interface.

19. The method of claim 17, further comprising:

outputting the null warning via email, text message, smartphone widget, smartphone notification, or telephone message.

20. A non-transitory computer-readable medium storing instructions that, when executed by a processor, causes a computing device to:

receive, at a remote server, weather data associated with a plurality of geographic locations, the weather data including a plurality of weather-related warnings associated with the plurality of geographic locations received from a third party;

receive, at the remote server, a user-specified location, a user-specified procedure, and a user-specified weather inquiry from a user via a graphical user interface, the user-specified weather inquiry comprising a weather-related warning of the plurality of weather-related warnings, and the user-specified procedure comprising an instruction that the user performs in response to the weather-related warning;

store, at the remote server, the user-specified location, the user-specified procedure, and the user-specified weather inquiry received from the user via the graphical user interface;

determining if the weather data includes the weather-related warning specified by the user specified weather inquiry in the user specific location; and output, from the remote server, the user-specified procedure to the user in response to the determination that the weather data: (i) includes weather-related warning specified by the user-specified weather inquiry and (ii) includes a change in severity of the weather data based on comparing forecast data for the weather data to previous forecast data for the weather data.

* * * * *